US009179684B2

(12) United States Patent
Van Stuyvenberg et al.

(10) Patent No.: US 9,179,684 B2
(45) Date of Patent: Nov. 10, 2015

(54) METHOD AND INSTALLATION FOR HANDLING POULTRY

(71) Applicant: TOPKIP B.V., Enschede (NL)

(72) Inventors: Wim Van Stuyvenberg, Zoelen (NL); Ary Dirkzwager, Enschede (NL); Danny Motshagen, De Meern (NL); Martin Mouthaan, Zoelen (NL); Twan Van Bijnen, Drunen (NL)

(73) Assignee: Topkip B.V., Enschede (NL)

( * ) Notice: Subject to any disclaimer, the term of this patent is extended or adjusted under 35 U.S.C. 154(b) by 0 days.

(21) Appl. No.: 14/357,922

(22) PCT Filed: Nov. 12, 2012

(86) PCT No.: PCT/EP2012/072413
§ 371 (c)(1),
(2) Date: May 13, 2014

(87) PCT Pub. No.: WO2013/072285
PCT Pub. Date: May 23, 2013

(65) Prior Publication Data
US 2014/0315475 A1    Oct. 23, 2014

(30) Foreign Application Priority Data

Nov. 14, 2011  (EP) .................................... 11189016
Jan. 3, 2012   (EP) .................................... 12150095

(51) Int. Cl.
*A22C 21/00*   (2006.01)
*A22B 7/00*    (2006.01)
*A22B 3/08*    (2006.01)

(52) U.S. Cl.
CPC ................. *A22B 7/001* (2013.01); *A22B 3/086* (2013.01)

(58) Field of Classification Search
USPC ....................... 452/52–54, 57–59, 63, 64, 67
See application file for complete search history.

(56) References Cited

U.S. PATENT DOCUMENTS

| | | | |
|---|---|---|---|
| 1,410,640 A | 3/1922 | Baker | |
| 2,490,761 A * | 12/1949 | McDowell, Jr. | 452/54 |
| 2,570,143 A * | 10/1951 | Merrick | 452/54 |
| 5,643,072 A * | 7/1997 | Lankhaar et al. | 452/66 |
| 6,899,613 B2 | 5/2005 | van den Nieuwelaar et al. | |
| 6,912,434 B2 * | 6/2005 | van den Nieuwelaar et al. | 700/116 |
| 7,217,437 B2 | 5/2007 | Van Stuyvenberg | |
| 7,597,615 B2 * | 10/2009 | van den Nieuwelaar et al. | 452/182 |
| 7,856,842 B2 | 12/2010 | Van Stuyvenberg | |

(Continued)

FOREIGN PATENT DOCUMENTS

WO    WO2010/133379 A1   11/2010

OTHER PUBLICATIONS

International Search Report and Written Opinion, PCT/EP2012/072413, Topkip B.V., Dec. 7, 2012.

*Primary Examiner* — Richard Price, Jr.
(74) *Attorney, Agent, or Firm* — Cook Alex Ltd.

(57) ABSTRACT

The present invention relates to a method for handling poultry, such as chicken, turkey, geese, duck and quail, comprising the steps of (i) taking the poultry; (ii) placing the poultry in a confinement such that the poultry legs extend from the confinement; and (iii) coupling the poultry legs to a handling unit, and to an installation for handling poultry, such as chicken, turkey, duck and quail that takes the poultry and places the poultry in a confinement such that the poultry legs extend from the confinement; and the poultry legs are coupled to the handling unit.

20 Claims, 19 Drawing Sheets

(56) References Cited

U.S. PATENT DOCUMENTS

| | | |
|---|---|---|
| 8,105,138 B2* | 1/2012 | Van Den Nieuwelaar et al. .............................. 452/177 |
| 2005/0181718 A1 | 8/2005 | van den Nieuwelaar et al. |
| 2006/0211354 A1 | 9/2006 | van den Nieuwelaar et al. |
| 2008/0242208 A1* | 10/2008 | van den Nieuwelaar et al. .............................. 452/182 |
| 2010/0022176 A1* | 1/2010 | Van De Nieuwelaar et al. .............................. 452/177 |
| 2012/0094002 A1 | 4/2012 | Van Stuijvenberg et al. |
| 2013/0309953 A1 | 11/2013 | VanStuljvenberg |

* cited by examiner

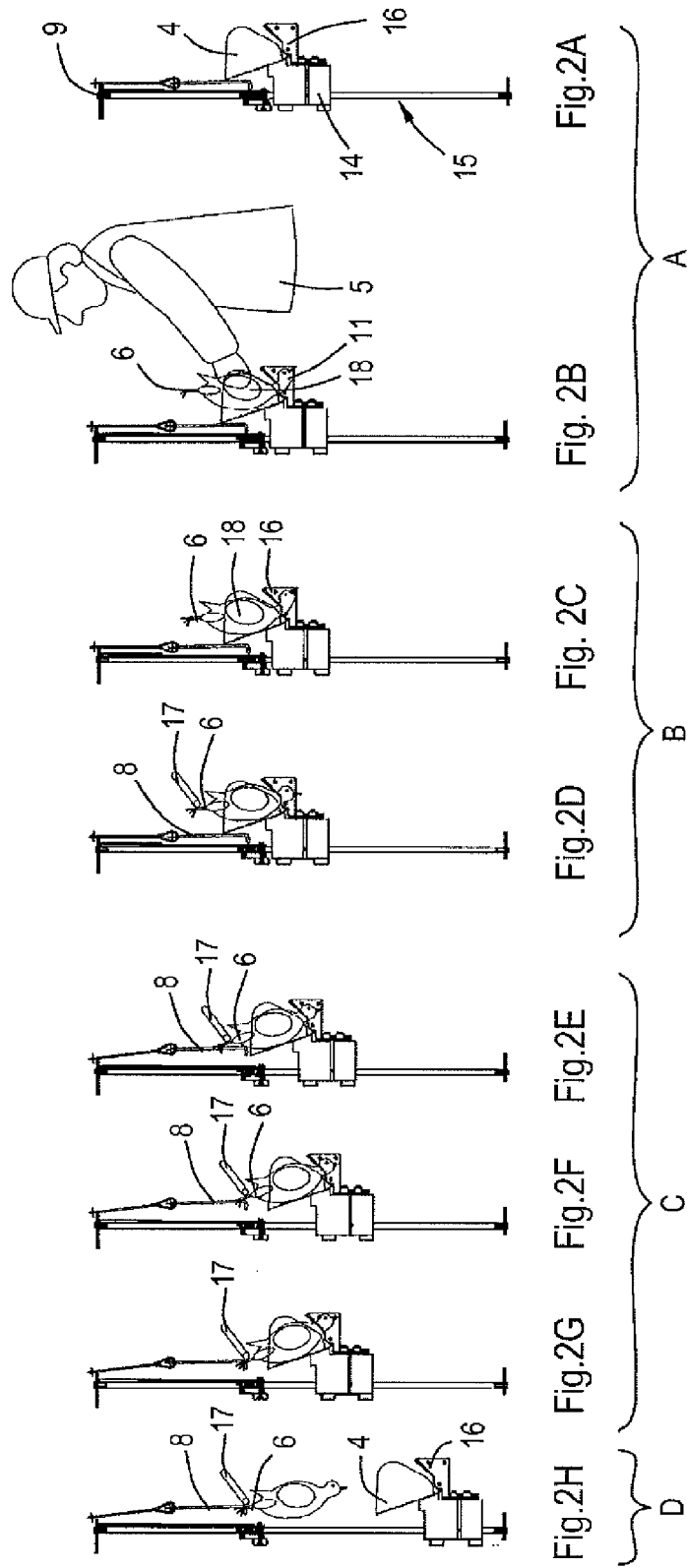

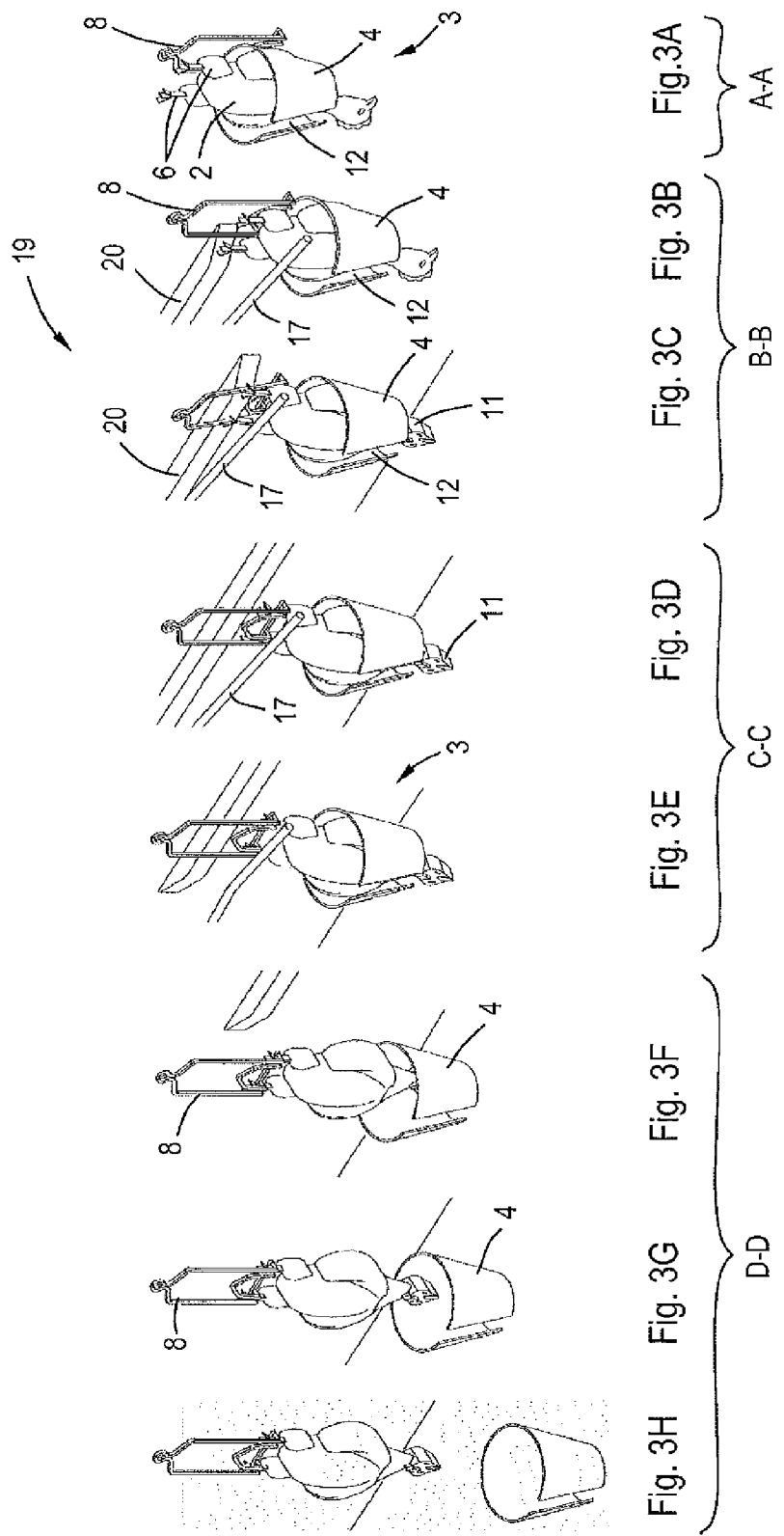

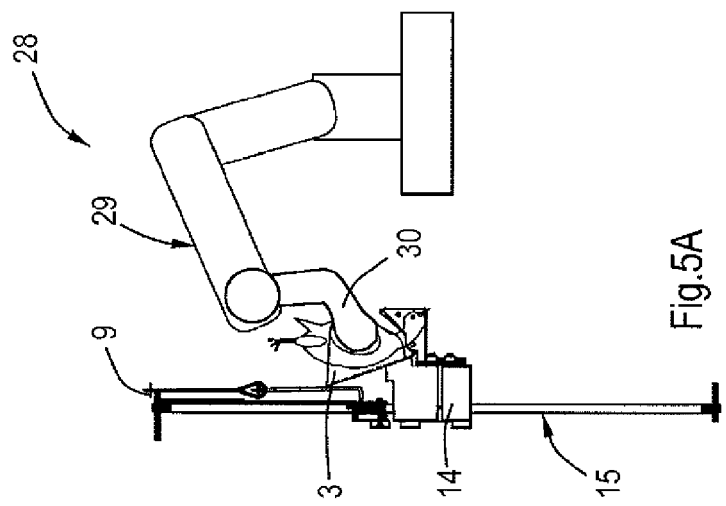
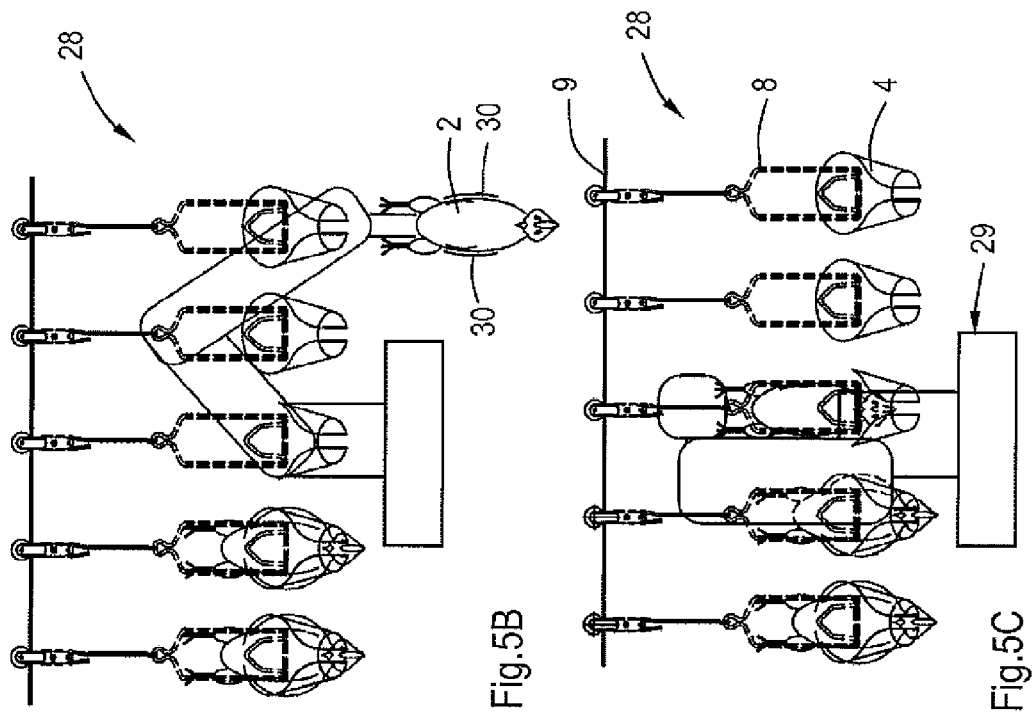

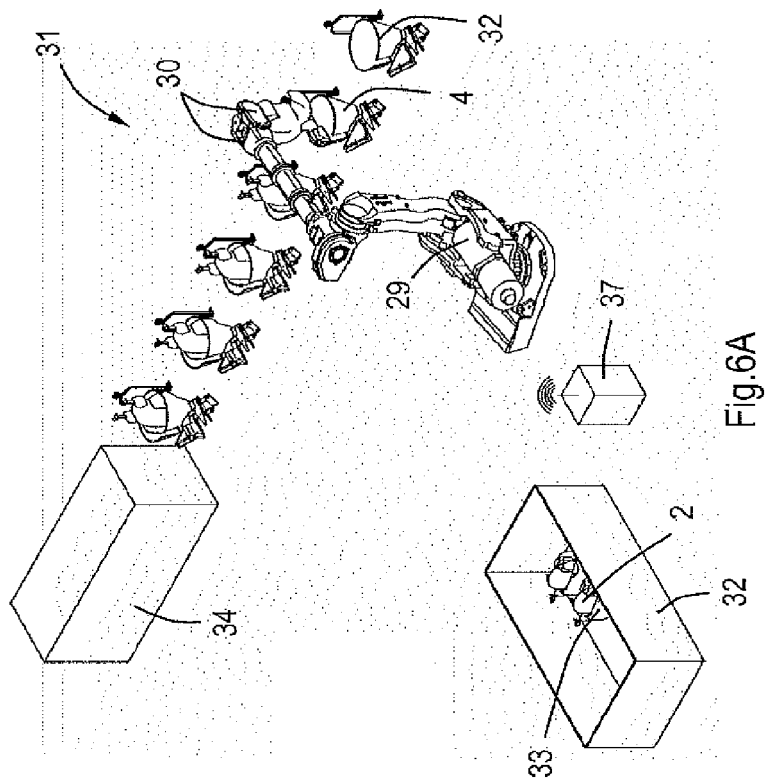
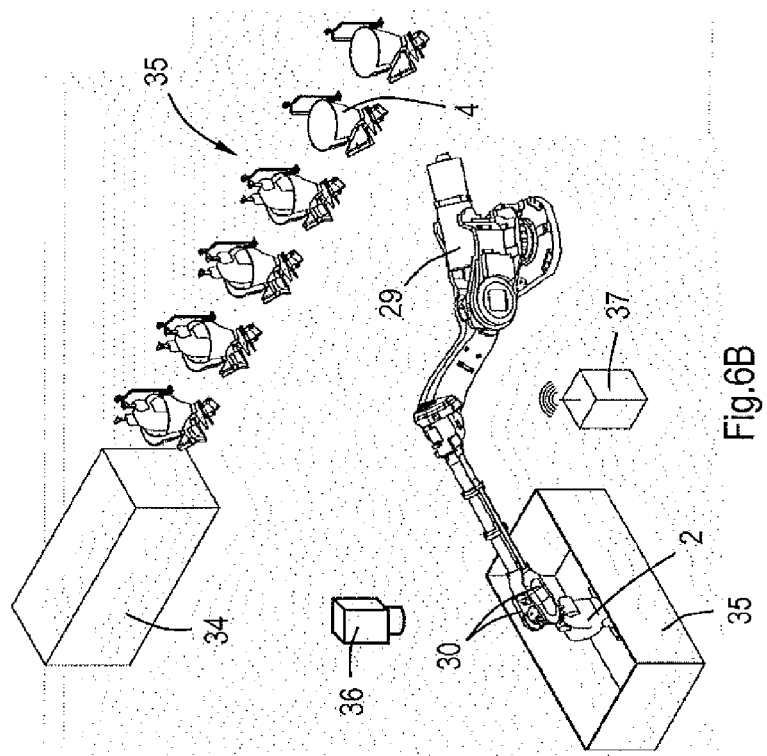

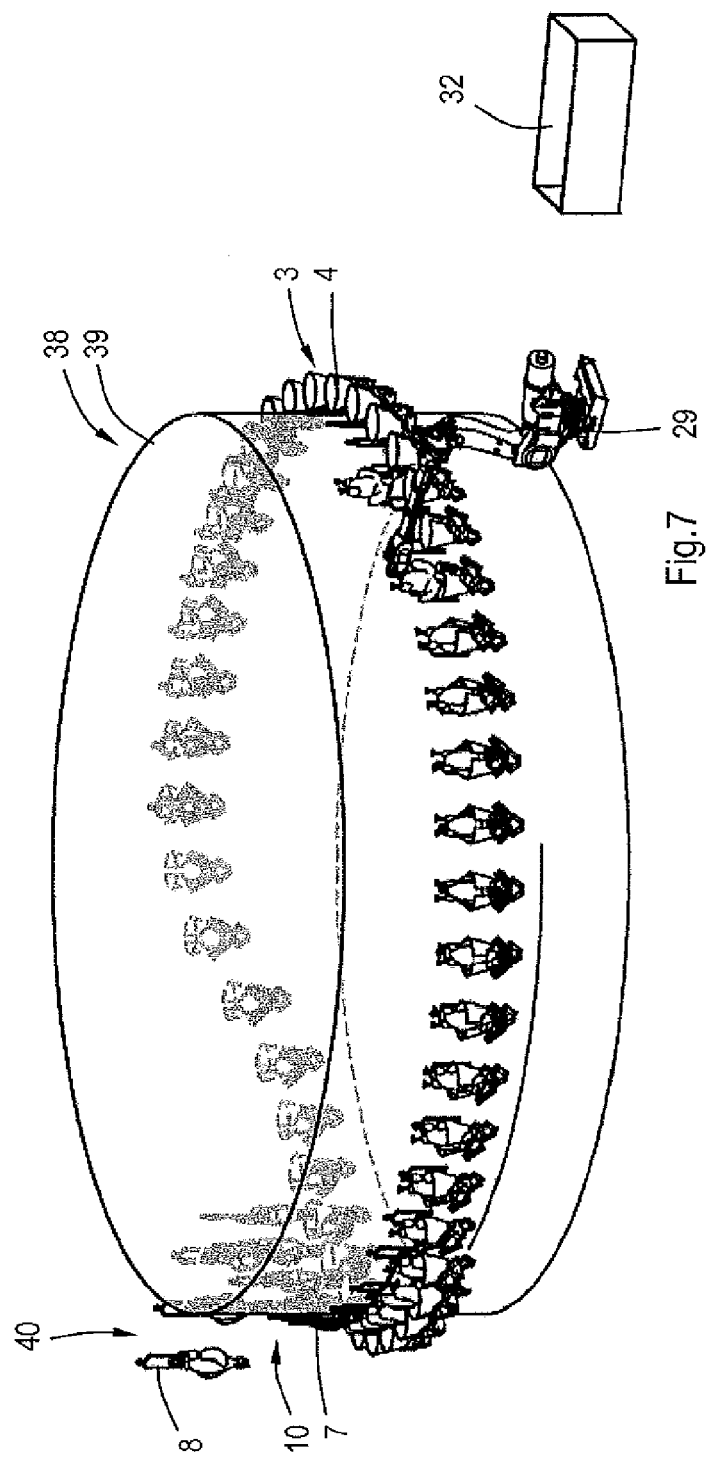

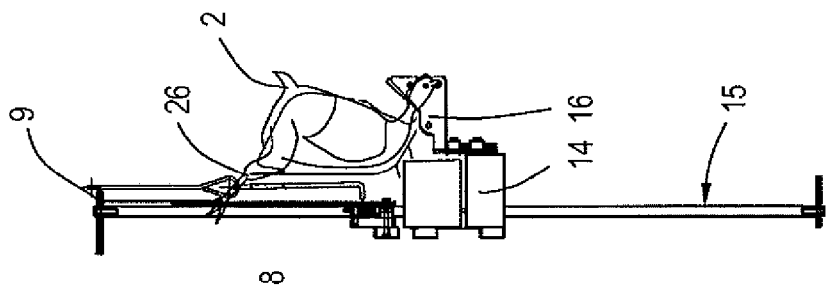
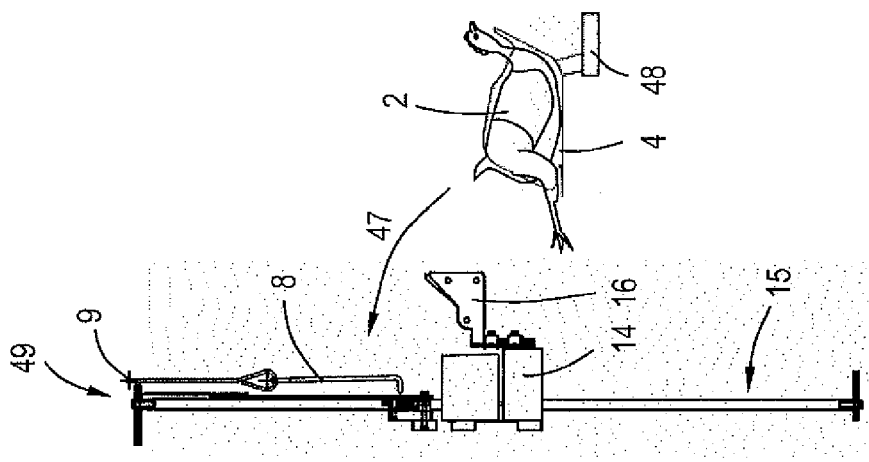
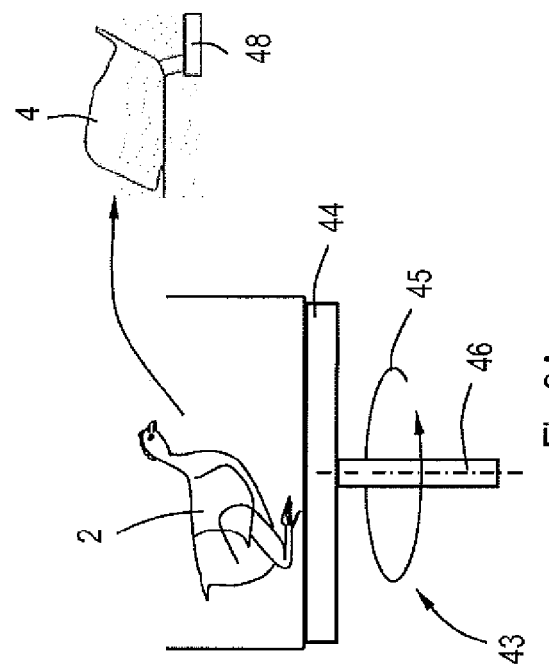

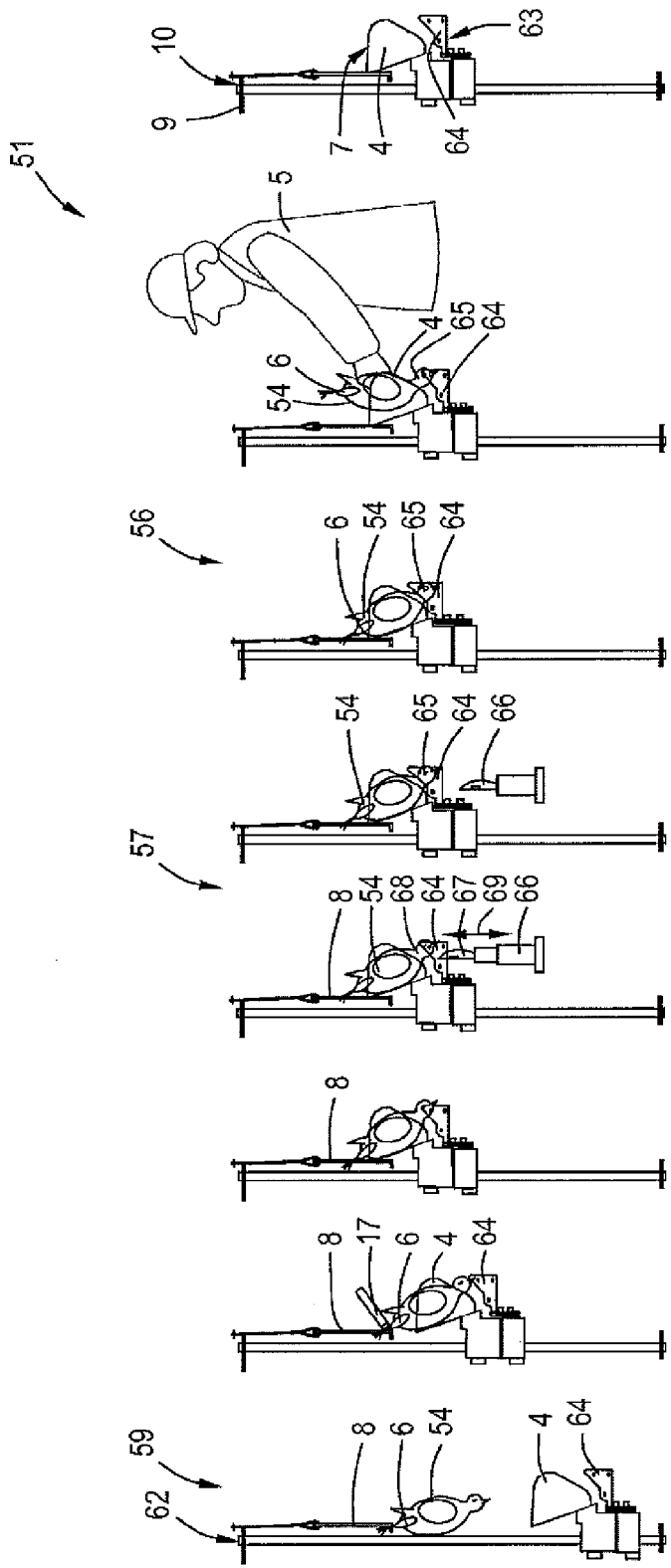

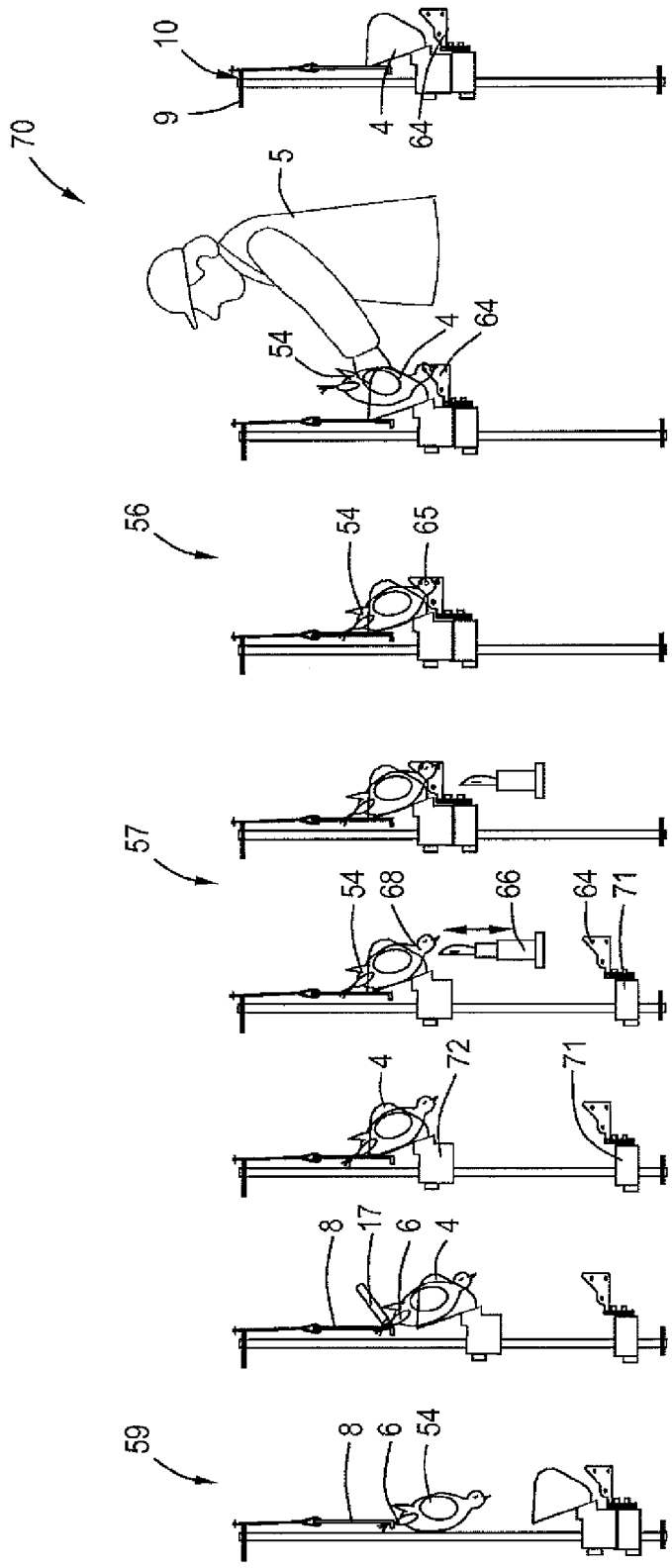

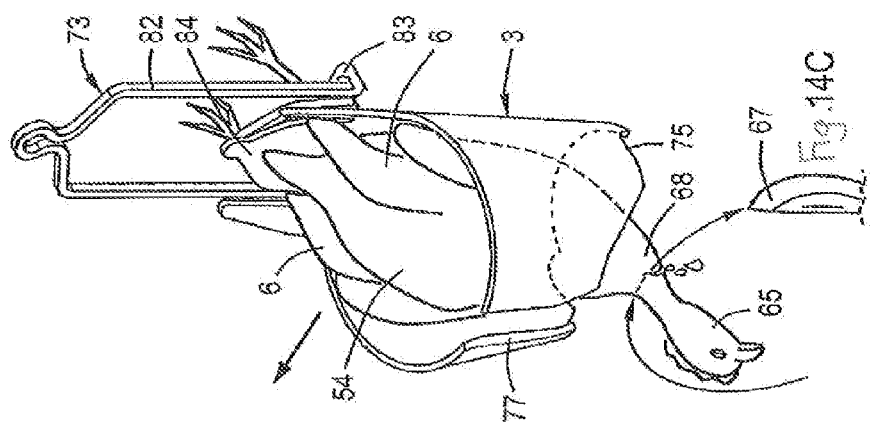
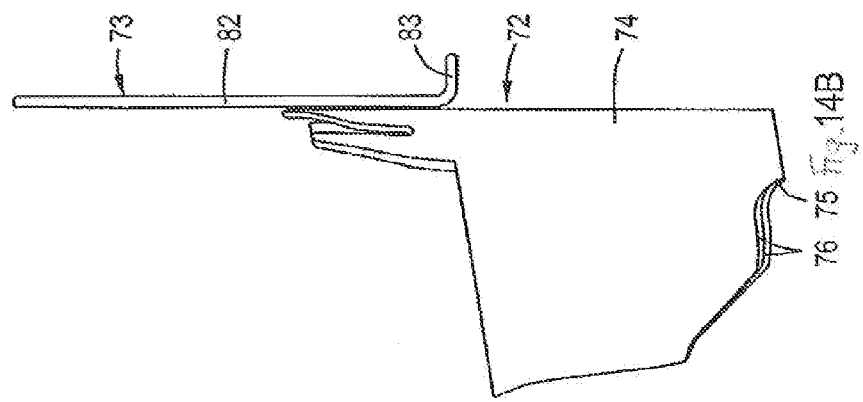
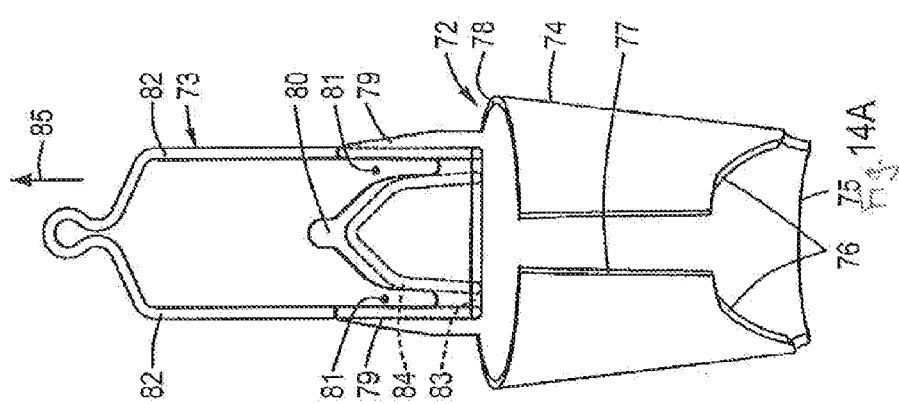

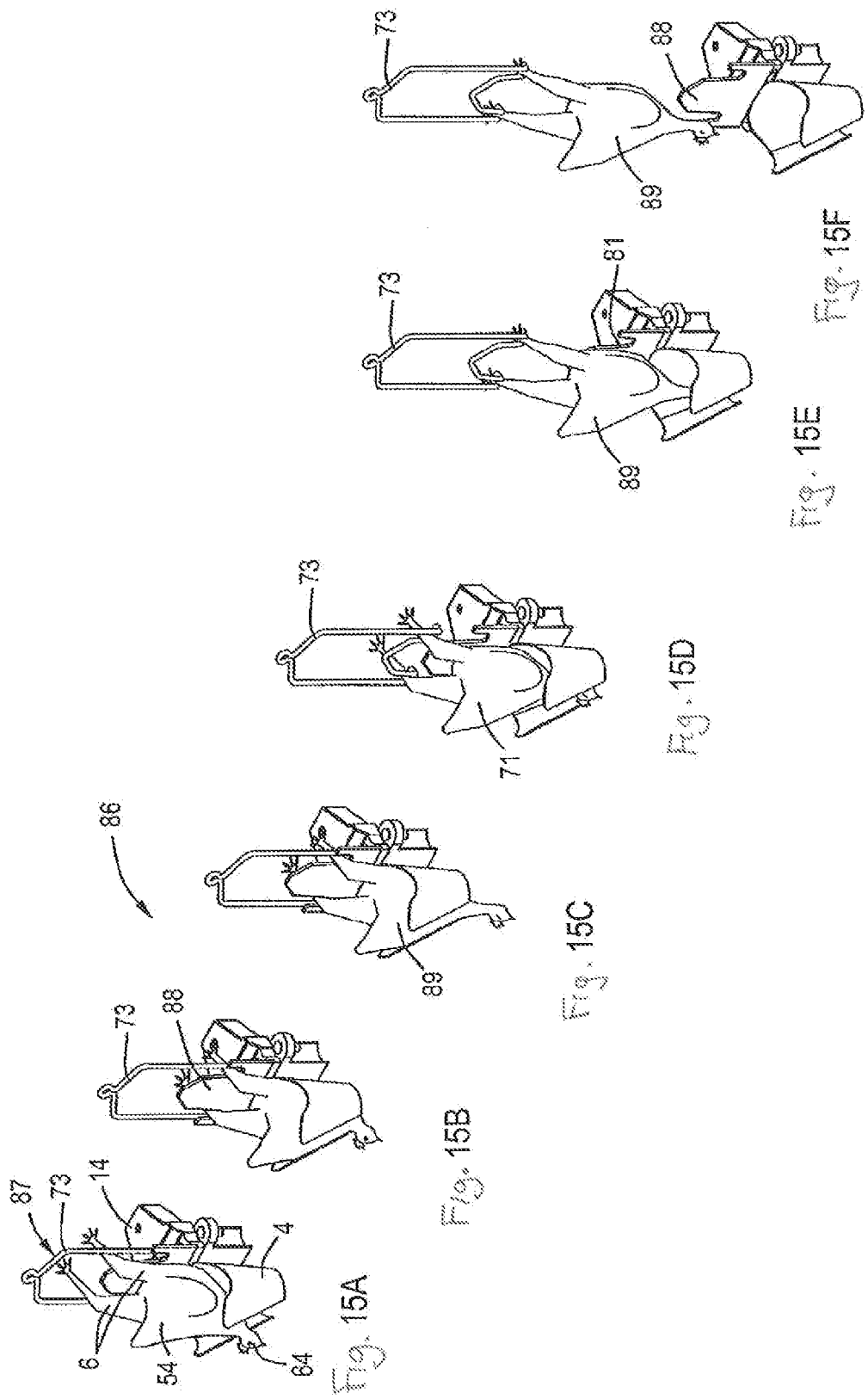

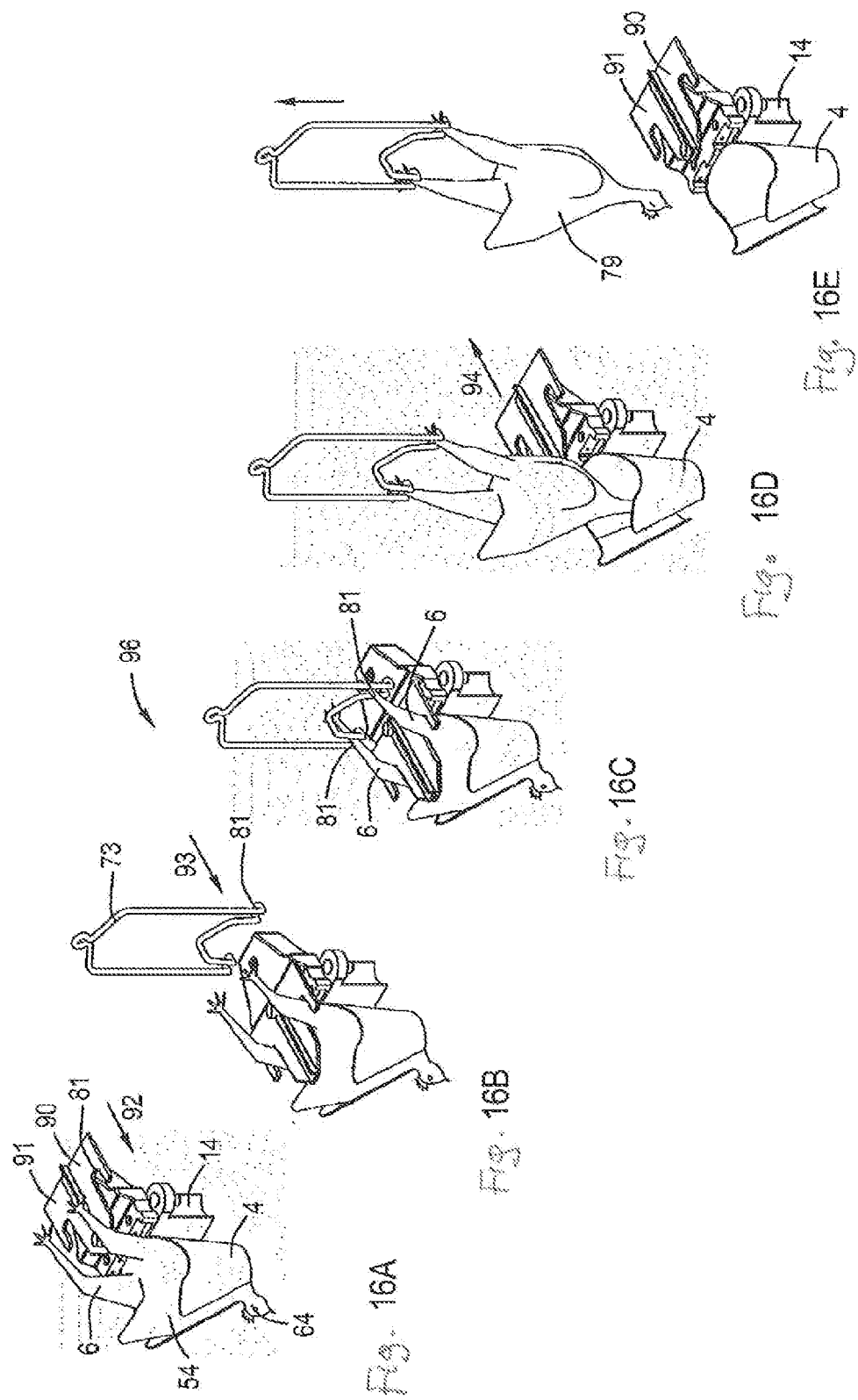

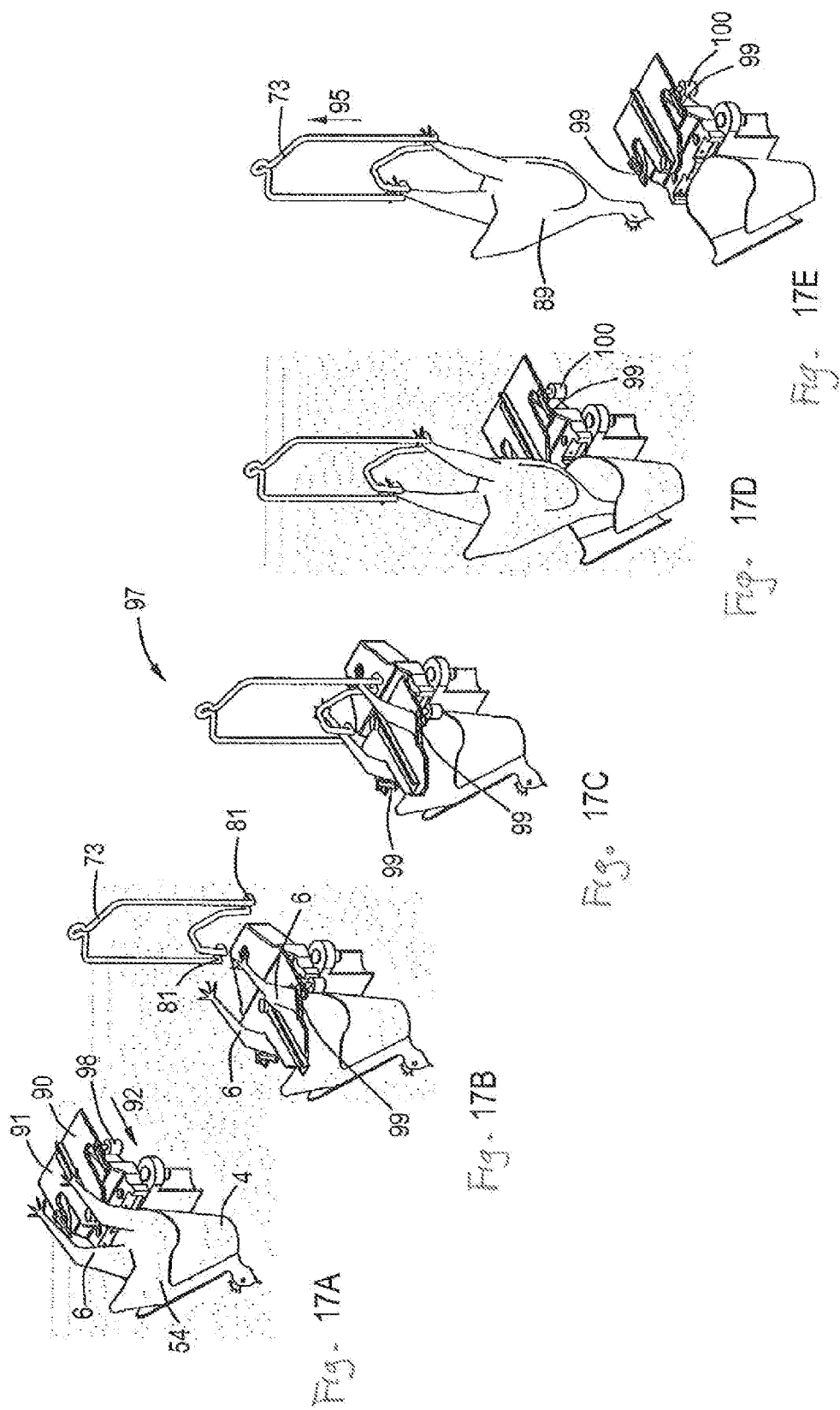

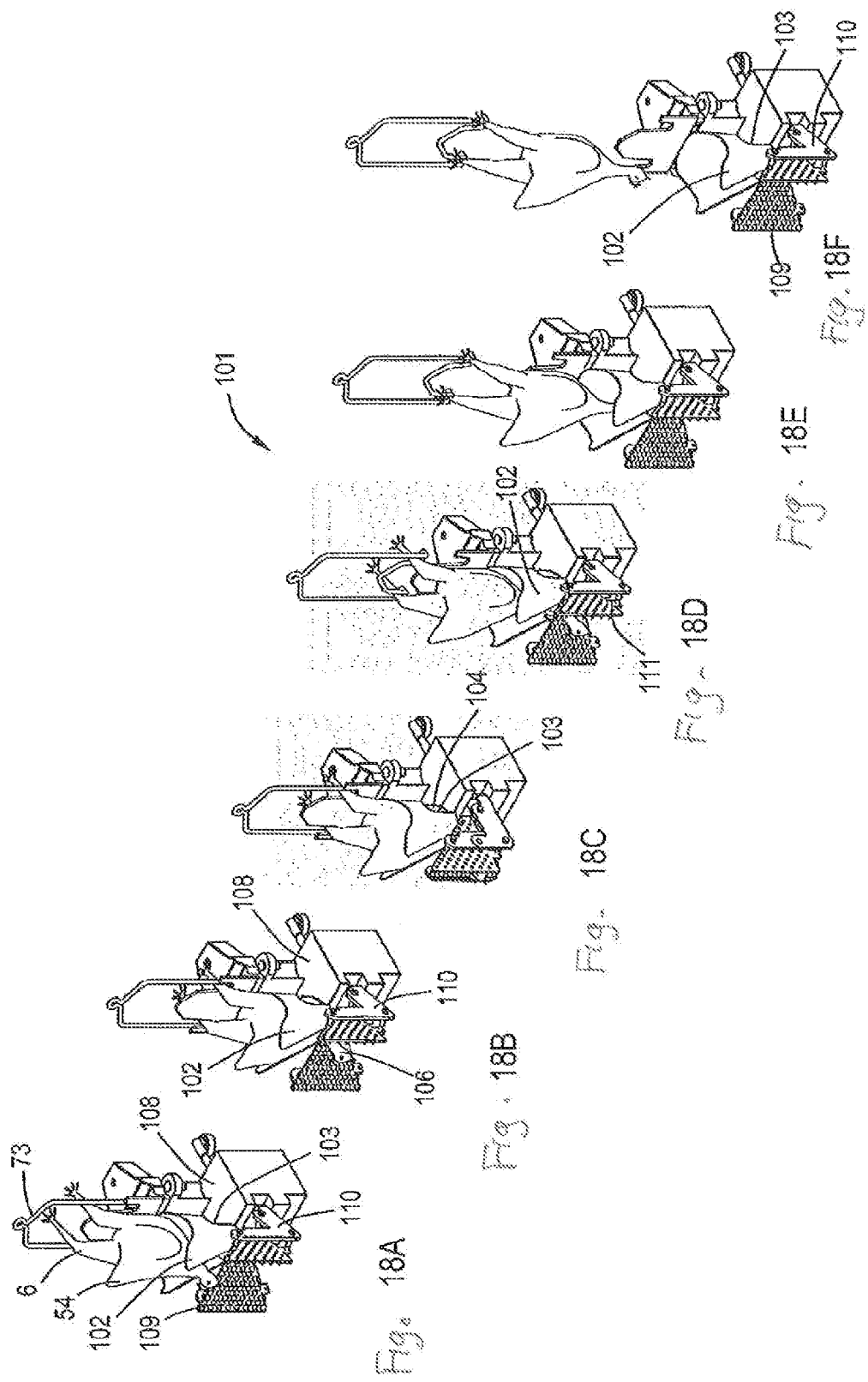

METHOD AND INSTALLATION FOR HANDLING POULTRY

BACKGROUND OF THE INVENTION

1. Field of the Invention

The present invention relates to a method and installation for handling poultry.

Presently, living poultry, such as chicken, turkey, geese, duck and quail, are delivered at a slaughterhouse in containers or cages.

The living animals are unloaded on a conveyor band or provided in containers or cages. Manually the poultry is taken by the poultry legs and in an downwardly suspended position with force hooked in shackles by the ankles of the animal. In order to keep the animals as quiet as possible the handling of the poultry occurs in a relatively dark environment.

The hooking of the animals with their ankles in the shackles is carried out with force in order to have the animals tightly hooked as to avoid release from the shackles and provide good electro conductivity when the animal is electrically stunned in a water bath.

Hooking of the animals with their legs in the shackles or other hooking means, is generating much stress and pain. Often the legs may be injured, dislocated or broken. In addition, it is possible that one of the legs is not correctly hooked so that the animal is suspended by one leg.

Due to this manner of poultry handling, many animals will have their wings fluttering resulting in undesired movement, excitement and also a possible release or damage of the animal or neighboring animal with one or two legs from the shackles by which they are transported to the slaughtering unit.

Presently it has become hardly acceptable to handle living poultry in the manner described above. Not only because of the impact on the animals, but also in view of the negative influence on the quality of the poultry product obtained. Because due to the stress and muscle contraction bones may be broken and poultry tissue infiltrated by blood.

2. Description of Related Art

US2008/0242208 discloses a method and device for processing a slaughtered animal. The slaughtered or stunned animal is suspended with its neck from a hook and in this position the neck blood vessels are cut. For processing the stunned or slaughtered animal to a higher level than a cut use can be made of a breast and leg support or leg gripper unit. This method and device cannot be used for handling living poultry.

SUMMARY OF THE INVENTION

The present invention has for its object to provide a method and installation for handling living poultry which avoids the above mentioned drawbacks and inacceptable animal handling and impact, and still provide a method and installation for handling poultry in which the living poultry is handled with low stress and substantially no injuries or generation of pain will occur, whereas the handling may be automated and carried out at high speed.

This is obtained with a method according to the invention for handling poultry, such as chicken, turkey, geese, duck and quail, comprising the steps of:
i) taking the poultry;
ii) placing the poultry in a confinement such that the poultry legs extend from the confinement; and
iii) coupling the poultry legs to handling means.

The gist of the invention is that the living poultry is placed in a confinement such that due to the anatomy of the poultry and in particular of the poultry knee joint, the poultry legs stretch and extend from the confinement. These extended legs are then used for coupling at the ankle joint to handling means. The poultry is placed in an anatomically acceptable and relatively quiet manner in a confinement. In the confinement the poultry is in a relatively comfortable position. Preferably the wings also enclosed by the confinement thereby avoiding stress generating wing fluttering.

The inner form and shape of the confinement is preferably adapted to the anatomy of the poultry to be confined.

The confinement may be a funnel with an opening through which the animal extends outwardly with its head and may its neck, whereas the rest of the animal body is confined. Preferably the confinement is a beaker of which the side wall is converging to its bottom and having a longitudinal slot in the side wall through which the neck of the poultry passes during confining. The neck and head of the poultry extend near the beaker bottom outwardly and may be supported.

Obviously, any type of confinement may be used which allows for confining the poultry in the above described manner with the legs extending and available for coupling to the handling means.

Due to the form of the confinement, the living animal has to stretch and extend its legs because of the anatomical orientation of the knee joint which when pressed toward the animal body during placement in the confinement will result in a natural anatomical stretching and extending of the legs from the rear part of the animal body. Being confined the animal is in a comfortable position and will stay quiet and appreciate hardly any stress. Having placed in the confinement, the poultry with its legs and extended it in a generally well defined position and localisation, then the extended legs can be coupled via the ankle joint to the handling means in a reliable manner, at low force, and at a speed which is well controlled.

The taking of the poultry and the placing of the poultry in the confinement may be done manually by a person or may be done mechanically, such as by a robot. The poultry is generally taken in a more or less anatomical manner which is well defined for the person doing it manually. But also for a robot this can be done in the same manner. Thereto, the robot may be guided for instance a camera that made an observation of the actual position of the poultry to be taken. In the alternative, the poultry may be offered to the robot in a pre-oriented position of the poultry, such as on a conveyor belt or in cages, containers or boxes. In this manner, the poultry with it legs extended may be coupled in a well defined and reliable manner to the handling means. The poultry will not be in a stressed or painful situation and the coupling can be carried out at low force, in a reliable manner, substantially without generating injuries to the animal in whatever manner.

After having confined the poultry animal in the confinement it is preferred according to an embodiment of the invention to stun the living poultry placed in the confinement. This may result in the advantage, that stunned poultry better stretches the legs which then will be available for coupling to the handling means in a more reliable manner. Furthermore, after having been placed in the confinement the living poultry is observing the changed environment and therefore is distracted and will observe in a less attentive manner the coming stunning procedure. In relation to this embodiment it is further preferred, that the stunned poultry is slaughtered. Slaughtering is possible in a reliable manner because the neck of the poultry is in a well defined position so that slaughtering by cutting the neck artery is performed at a well localised position. In addition, slaughtering after stunning can take place within a relatively short time period so that stunning is only required for a time period during which the animal is unconscious. This allows for a less stringent manner of stunning. Furthermore, having confined the animal the stunning and slaughtering can take place with also confined the wings of the poultry so that any interference of wings while slaughtering can be avoided. Obviously, when slaughtering is to take place in a halal manner, it is possible to slaughter the living animal after having been confined in the confinement. After being slaughtered by cutting the neck artery and debleeding, the killed animal is subjected to dissectioning for collecting animal parts such as meat, and organs.

In order to have a coupling of the poultry legs to the handling means carried out in a reliable manner, this coupling may be carried out by a relative movement in between the confinement and handling means. This means that either the confinement may be moved towards the handling means for coupling the extended poultry legs to the handling means, or the handling means may move towards the confinement. This means that either the poultry legs are stationary or the handling means are stationary. In the alternative, it is also possible to couple the extended legs to the coupling means by a relative movement in which the confinement and the handling means are moved towards one another in a reliable and predetermined manner.

When being coupled with its poultry legs to the handling means, the poultry may be transported to poultry working means. In a preferred embodiment, the coupling of the poultry legs to the handling means is carried out such that the confinement and handling means both move at substantially the same speed (at least during coupling) as the transport means. This means that when the confinement and the handling means are reciprocating to one another they both are transported by the transport means with the same speed, so that there is no difference in speed in between the confinement and the handling means other than in relation to the realisation of the coupling of the poultry legs to the handling means. Obviously, the coupling may also take place with the confinement and the handling means move at different speeds.

According to a preferred embodiment the transport by the transport means of on the one hand the handling means and on the other of the confinement, is synchronised.

The confinement may be a confinement which has the form of a beaker comprising a sidewall which is having a form similar to the outer body of the poultry. This means that the sidewall converges towards the bottom and that via the lateral opening in the sidewall the animal may extend with its head and neck to the outside. In the alternative, a converging funnel may also be used as a confinement. Also separate blades or arms may be used which will confine the poultry in an comfortable and anatomically acceptable manner and have the poultry legs extend outwardly from the animal body, so that the extending legs may be coupled to the handling means.

It is important that the confinement is accommodating the animal in a more or less anatomically supported manner such that its legs will extend from the confinement and preferably the head in another direction of the confinement. In this manner the living animal is in a relatively stress less situation allowing further handling and coupling in a reliable manner.

The coupled living poultry may be slaughtered by stunning using for instance electro stunning or gas stunning. Electro stunning may be carried out by emerging the animal head into a water bath through which an electric current is passed into the body of the poultry. Electro stunning may also be carried out by head-head stunning, head-leg stunning and/or head-cloaca stunning. In this respect one or more electrodes are connected to the head and another electrode to the head, the leg and/or the cloaca. By this type of electro stunning using electrodes it is possible to measure the electro conductivity of the animal and determine the amount of electrical power required for carrying out sufficient electro stunning of the animal until the animal is slaughtered while being unconscious. Animal stunning may also be carried out by gas stunning.

When the coupled living poultry is to be slaughtered in the so-called halal manner, then the animal after being coupled is directed towards the slaughter unit in which the animal is slaughtered and debleeded and where after the killed animal is dissectioned.

Stunning may be carried out at some distance after having coupled the poultry with its leg to the handling means. Otherwise, and preferably, the living poultry is (preferably electro) stunned directly after having being coupled to the handling means and while still present in the confinement. This allows for a precise and reliable electro stunning of the animal because of for instance the correct and exact localisation of the animal head. Such electro stunning may be carried out preferably by head-head stunning using two electrodes which are temporarily contacted sidewise to the animal head.

However, it is also possible that the living poultry after being placed in the confinement is first stunned and subsequently in the stunned and unconscious state by the extending legs coupled to the handling means.

Traditionally the living animals to be slaughtered are hooked and in a suspended position transported to the slaughter unit. According to a preferred embodiment, the coupling of the poultry legs to the handling means is in the form of hooking the poultry legs to hook means, such as shackles, which are comprised by the handling means and have been incorporated in the transport means. The handling means comprise structures for hooking a some determined distance the poultry legs.

The living animals are hooked into the handling means and transported in the suspended position to the stunning or slaughter unit and working units. This allows for the incorporation of this innovative and novel method into existing methods and installation for slaughtering poultry.

As mentioned above, the poultry is placed into the confinement such that the poultry legs and extend from the confinement and the poultry legs are then coupled to the handling means. In order to allow for a coupling in a very reliable manner, it is preferred that the poultry legs are positioned in a particular position which is predetermined and used for steering and operating the handling means. Thereto, the installation of the invention comprises positioning means in the form of structured element, such as having a wedge shape, which is moved in between the legs extending from the confinement. The positioning means may be part of the confinement or a separate positioning means movable in between the legs. The positioning means are arranged and designed such that the positioned legs are aligned relative to the handling means, such as a shackle, to which the legs are to be coupled. According to another preferred embodiment or in combination with a former embodiment, it is an option to arrest the poultry legs in the extended and preferably defined position, such that any undesired abrupt or spastic movement of the animals or its legs is avoided so that the animal legs after having been positioned and/or arrested are in a well defined and fixed position. Thereto the installation comprises arresting means for arresting the legs extending from the confinement. The arresting means may have to form of a bar extending over the legs extending from the confinement, or means that realisably arrest the extending legs until the legs are coupled to the handling means.

As indicated before the poultry is taken manually or automatically with a robot and then placed in the confinement. However the confinement is such that the poultry is to be placed into the confinement in a predetermined manner and position. This means for manually taking the poultry that the poultry has to be turned in its sitting position with the head in a particular direction and from there, normally by a curved movement placed in the confinement. This placing movement is not appreciated by the animal as stress full. But the animal being curious is following the movement such that ultimately the poultry is looking around in a preferably suspended position to the place from which he was moved.

When using an automatic taking of the animal, such as by a robot, the robot will take the animal, bring it in a predetermine position and from that position will carry out a movement such that the poultry is placed in the confinement in the predetermined manner. Obviously it is possible to have camera observation of the animal before it is taken by the robot, so that the robot with its robot arms will take the animal already in such a manner that a simple less curved movement path is to be carried out for placing the poultry in the confinement. According to another embodiment it is possible that the poultry before being offered for taking manually or automatically is already brought in a position in which it is offered such that a simple movement is sufficient for bringing it in the confinement placed position.

Another aspect of the present invention relates to an installation for handling poultry. The installation according to the invention comprises:
 means for taking the poultry and placing the poultry in a confinement such that the poultry legs extend from the confinement; and
 means for coupling the poultry legs to handling means.

As indicated herein before the coupling means and the confinement are able to carry out a relative movement for coupling the poultry legs to the handling means which have preferably the form of traditional hooking means such as shackles. During the coupling of the poultry legs to the handling means, the handling means and the confinement move in a generally same linear transport speed.

The installation may comprise stunning means for stunning the living animals before being slaughtered. Stunning may be carried out by gas stunning or by electro stunning as discussed herein before. The stunning may be carried out after the living animal has been placed into the confinement and before further transport. Otherwise it is possible after being placed in the confinement that the living animal is transported to separate stunning means. It is preferred that directly after placing the poultry into the confinement that the animal is subjected to electro stunning most preferably by head-head stunning by placing electrodes to both sides of the head.

After measuring of the conductivity the required electro power can be determined for stunning the animals sufficiently long as to stay unconscious up to being reached and slaughtered in the slaughter unit. The electrical current to be applied is generally within the range of 30-400 mA. Preferably the range is between 240-350 mA, like 150-300 mA, such as 240 mA. The stunning takes place in a relatively short time period such as between 0.05-10 seconds preferably 0.1-3 seconds. The stunning is such that the animal stays unconscious for at least about 30 seconds, such as 35-50 seconds or preferably for at least 40 seconds like 45 seconds or 60 seconds, such as 45-60 seconds. Obviously it is also possible to have the animals stunned by dipping in a water bath and passing electrical current through the water bath and the animal. Also gas stunning is considered suitable for use.

The confinement may comprise structural elements, such as pins, dimples or indentations which will accommodate the extending legs such that the poultry legs are in a particular position relative to the confinement and therefore relative in relation to the handling means. The structural elements or positioning means may be part of the confinement or are movable towards the legs extending from the confinement. Preferably the positioning means are in the form of structural element, such as having a wedge shape, which is moved in between the legs extending from the confinement. The positioning means may be part of the confinement or a separate positioning means movable in between the legs. The positioning means are arranged and designed such that the positioned legs are aligned relative to the handling means, such as a shackle, to which the legs are to be coupled. This allows for a reliable hooking or coupling of the animal legs to the coupling means preferable of the shackles.

In order to avoid any undesired movement of a leg after the leg has been extended from the confinement and preferable positioned in the positioning means, then the animal legs are arrested such that the animal cannot no longer in a substantial manner move its legs from the extended position to a retracted position or any other side or hide movement. Thereto the installation comprises arresting means for arresting the legs extending from the confinement. The arresting means may have to form of a bar extending across over the legs extending from the confinement, or means that realisably arrest the extending legs until the legs are coupled to the handling means. Obviously, the poultry legs may also be arrested without being positioned.

Obviously it is possible to have the living animals stunned before the legs are coupled to the handling means. However, it is preferred that the living poultry is first coupled to the handling means before being stunned. If stunning is taking place at a different location from the unit in which the poultry legs are coupled to the handling means, than is preferred that the animal legs are positioned and/or arrested before coupling.

When the installation comprises means for orienting the poultry before taken manually or automatically, it is preferred that such means comprise either open cages or supporting elements which have the animal accommodated in a predetermined position such as a position in which the animal is having its head facing the person who will manually take the poultry or facing the robot that will take the poultry. If better, it is also possible that the head is oriented in a direction remote of the person or robot that is to take the animal. The predetermined position is such that the animal taken is moved in a manner such into the confinement that the poultry substantially does not experience any stress or fear.

According to a preferred embodiment comprises the confinement a poultry breast opening. Such breast opening provides more space for accommodating and confining larger poultry like larger chicken hens. This will optimize the positioning and/or the movement of the leg extension from the confinement. In the alternative or in addition, the installation comprises electro stunning means having at least one electrode that pivots in a substantially horizontal plane. Since the electrode (or electrodes) move(s) in a horizontal plane at the poultry eye level, this will result in a more optimal electro stunning. Although described in relation to the installation of the present invention, both the confinement with the breast opening and the horizontally pivotable electrode(s) may be used separately and in combination with other installations for stunning and/or slaughtering poultry.

Mentioned and other characterizing features of the method and installation according to the invention will be further elucidated and illustrated by making reference to the annexed drawings which are given for information purposes only and not intended to limit the invention in any aspect. In the drawings:

BRIEF DESCRIPTION OF THE DRAWINGS

FIGS. 2A-2H are side views of the various stages of handing poultry with the installation shown in FIG. 1;

FIGS. 3A-3H are various perspective views of the handling of poultry according to another embodiment;

FIGS. 5A and 5C are a front view, and FIG. 5B a side view of another installation for automatic handling poultry according to the invention;

FIGS. 6A and 6B show in perspective view two embodiments for handling poultry using a robot;

FIG. 7 is a perspective view of a carrousel used carrousel type of installation according to the invention for automatic handing of poultry;

FIGS. 9A-9C show poultry orientation prior of being taken and placed in to a confinement;

FIG. 12 is a side view of the installation according to FIG. 11 at various locations;

FIG. 13 is an alternative of the installation as shown in the FIGS. 11 and 12;

FIGS. 14A-14C show an alternative confinement with adapted handling means;

FIGS. 15A-15F show an alternative of the installation of the invention provided with positioning means;

FIGS. 16A-16E show another alternative of the installation of the invention provided with positioning means;

FIGS. 17A-17E show another installation of the invention of the invention provided with positioning means and arresting means.

FIGS. 18A-18F show another installation of the present invention also provided with horizontally reciprocating electrodes.

DETAILED DESCRIPTION OF THE INVENTION

Figure 1:
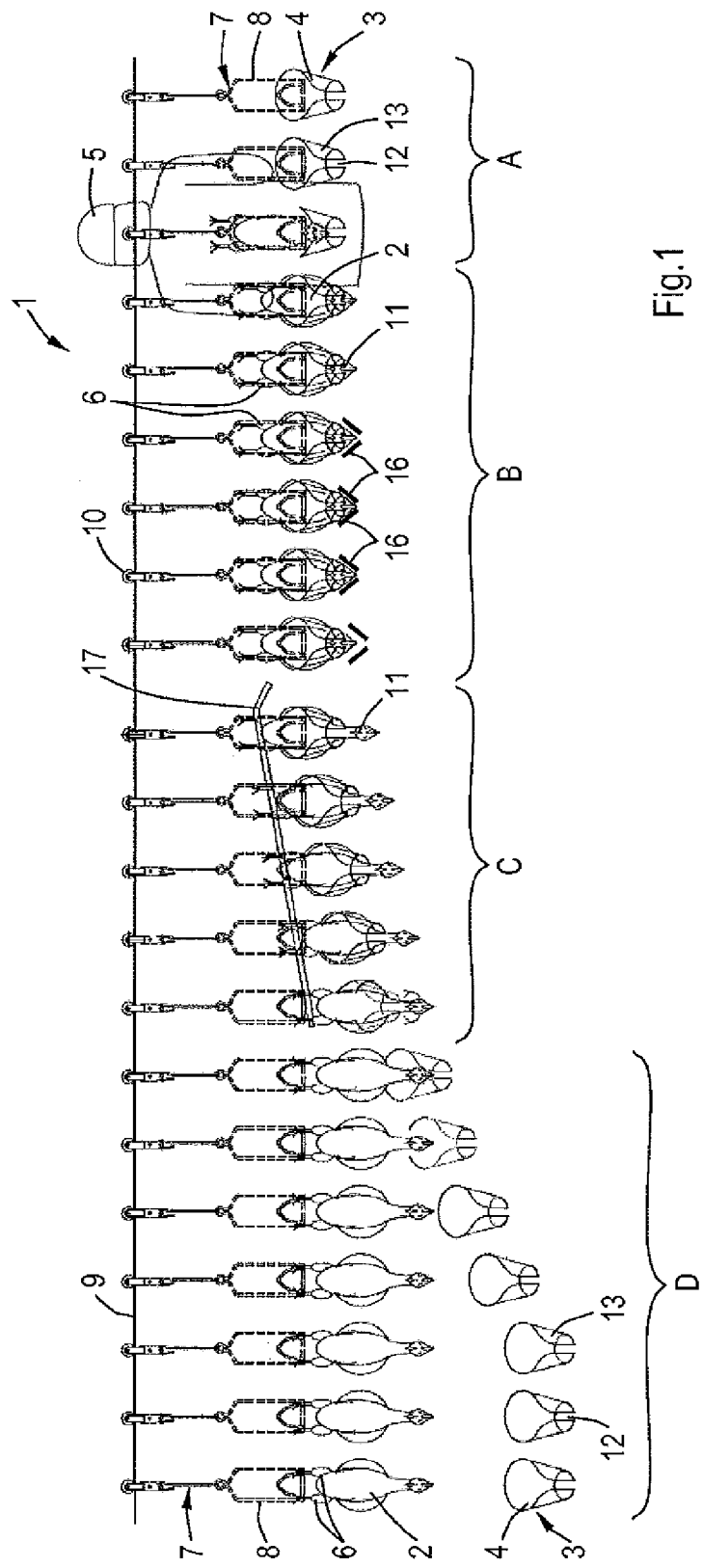
FIG. 1 is a schematically front view of an installation according to the invention for handling poultry.

FIG. 1 shows an installation 1 according to the invention for handling living poultry 2, such as a chicken 2. The installation 1 comprises confinements 3 in the form of beakers 4. The poultry 2 is taken by a person 5 and placed in the beaker 4. In the confinement 3 the poultry extends its legs 6. The legs 6 are coupled to handling means 7 having the form of shackles 8. The shackles 8 are coupled to the chain 9 of transport means 10.

The person 5 takes the poultry 2 and places the poultry 2 in an oriented manner in the beaker 4. As shown in FIG. 1 the poultry 2 extends with the head 11 and neck through a slot 12 in the converging wall 13 of the beaker 4. The poultry 2 is placed in the confinement 3 at low stress and feels comforted when accommodated in the confinement 3.

The beaker 4 is mounted on a rider 14 which is vertically movable along guiding means 15, which rider 14 is also provided with head electrodes 16 for electro stunning, see also FIG. 2.

In section A in FIG. 1, the poultry 2 is taken and placed by the person 5 in the beakers 4. In the next section B the confined living poultry 2 with the legs 6 extending are electro stunned by head-head stunning using the electrodes 16. The legs 6 of the stunned and unconscious poultry 2 are arrested at the beaker 4 by an arresting bar 17 which holds or arrests the legs 6 at the beaker 4. The bar is inclined downwardly as the beaker 4 is moving downwardly in section C. Due to the downward movement of the beaker 4 the extended and arrested legs 6 are coupled to the shackle 8 by the angles. During the coupling action the beakers 4 and the confinements 3 move sidewise by the transport means at the same speed although they move relative to each other in vertical direction. The unconscious poultry 2 coupled via the ankles to the shackles is transported to working means, such as means for debleeding and the like. The coupling of the poultry 2 in this stress less and low injury manner proceeds in a reliable manner and at a speed of for instance as of 800 birds per hour, such as 2000 to 14000 birds per hour.

As shown in FIG. 2, the person 5 takes a living poultry 2 with the wings 18 pressed against the poultry body and places the poultry in the beaker 4 with the head down and legs 6 upward in section A. In section B the electrodes 16 are pressed against the head 11 which is extending out of the beaker 4. The conductivity is measured and a calculated electric current is lead trough the head 11 such that the poultry 2 remains unconscious until being slaughtered in the working unit. In section C the bar 17 arrests the legs 6 at the beaker 4. The beaker 4 is lowered and the arrested legs 6 are coupled to the shackle 8. In section D the beaker 4 is separated from the unconscious poultry 2 hanging with the ankles from the shackle 8.

FIG. 3 shows another installation 19 at various stages. In stage AA the living poultry 2 is placed in an oriented manner in the confinement 3 having the form of a beaker 4. The beaker 4 has a slot 12 through which the head 11 extends. The legs 6 extend from the beaker upwardly. In section BB the legs 6 are arrested at the beaker 4 by a bar 17 and a ridge 20 moving the shackle 8 forwardly towards the confinement 3. In section CC the poultry 2 is electro stunned with the electrodes 16 pressed against the sides of the poultry head 11. After stunning in section DD, the beaker 4 is moved downwardly whereby the legs are coupled to the shackle 8. Obviously, coupling could also be accomplished by moving the shackles 8 upwardly, or moving shackles 8 and confinements 3 in remote directions.

Figure 4C:
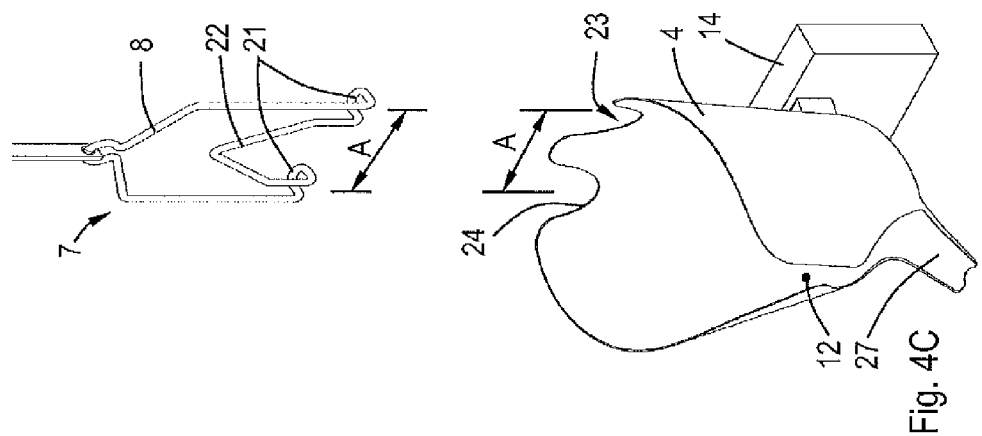
FIGS. 4A-4C are detailed views of the animal in the confinement, with the animal being coupled and arrested to the handling means, and the confinement and coupling means in relation to the localization of the extended legs.
Figure 4B:
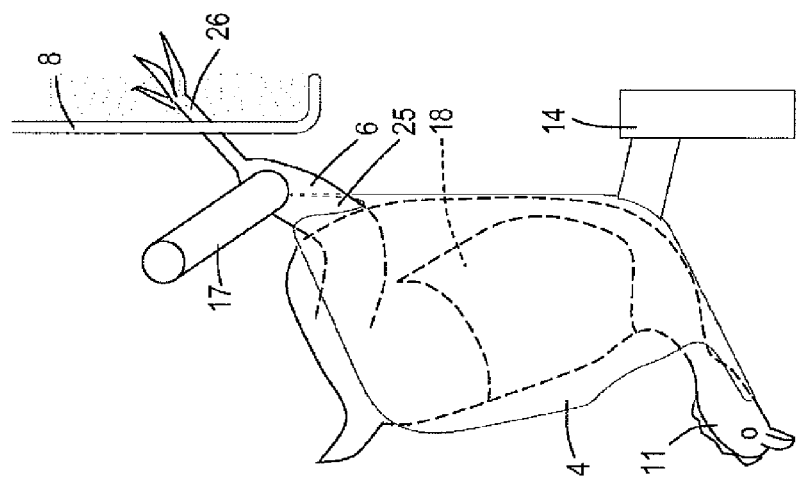
Figure 4A:
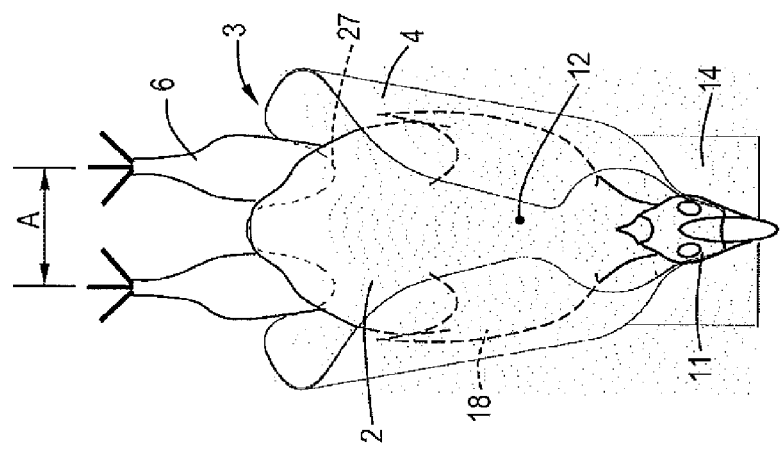

FIG. 4 shows more in detail the cooperation between the confinement 3 and the handling means 7. As shown in FIG. 4A the poultry 2 is confined with the wings pressed against the body in an anatomical manner in the beaker 4 of the confinement 3. The head 11 passed through a lateral slot 12 and extends outwardly. The legs 6 extend outwardly at a distance A. The distance A is fixed by the positioning means 23 having the form of indentations 24 arranged in the beaker 4 at the distance A.

The knee joint 25 allows for an extension of the legs 6 when pressed by the beaker inner wall to the body of the poultry 2. A arresting bar 17 is arranged over the legs 6 so that the legs 6 are lodged in the indentations 24 avoiding the legs 6 by undesired movements of spasms to be released from the in indentations 24. In this position the legs also extend beyond and above hooks 21 of the shackle 8. These hooks 21 are maintained at the distance A by a spacer 22. When the beaker 4 is connected to the rider 14 the bar 17 moves away from the shackle 8, then the legs 6 with the ankles 26 are caught by the hooks 21 and thereby coupled to the shackle 8 comprised by the handling means 7, see FIG. 4B. As shown in FIG. 4C the beaker is provided with a support 27 for the head 11 of the poultry.

FIGS. 5A and 5B show another installation 28 according to the invention. This installation 28 comprises a robot 29 for taking the poultry 2 and placing the poultry 2 in the confinement 3 having the form of a beaker 4. The robot 29 takes the poultry 2 with the robot arms 30 such the wings 18 are pressed against the poultry body and by a curved movement of the taken poultry is placed into the beaker 4 as described above.

FIG. 6A shows an installation 31 according to the invention comprising a robot 29 which takes with the robot arms 30 the poultry 2 from a supply unit 32. The supply unit 32 accommodates the poultry 2 in an oriented manner on separate supports 33. The robot 29 takes the pre-oriented poultry 2 from the supply unit 32 and places the poultry in the desired position in the beaker 4. Hereafter the beaker 4 confining the living poultry is transported to a stunning unit 34 for electric, gas or water bath stunning.

In FIG. 6B the poultry 2 are provided in the supply unit 35 but in random orientation. A camera 36 observes the poultry 2 to be taken by the robot arms 30 and steers the robot arms 30 such that the poultry 2 is taken and moved into the beaker 4 in the desired position as described. The filled beaker 4 is transported to the stunning unit 34. The robots 29 are controlled by a control unit 37 such that the installation can be operated in a closed space in the absence of personnel thereby improving the hygienic conditions.

FIG. 7 shows another installation 38 according to the invention. The confinements 3 and the handling means 10 are arranged on a carousel 39. The confinements 3 in the form of beakers 4 are permanently mounted on the carousel 39 and can move vertically mounted on the described rider 14. The robot 29 places the poultry 2 in the beakers which are then in a cooperative interaction mode with the handling means 7 in a sector 40 along the carousel 39. In this sector 40 the beakers 4 move downwardly thereby hooking the poultry 2 with the ankles 26 to the shackles 8. The shackles 8 leave the carousel 39 and are transported to the working unit (not shown).

Figure 8:
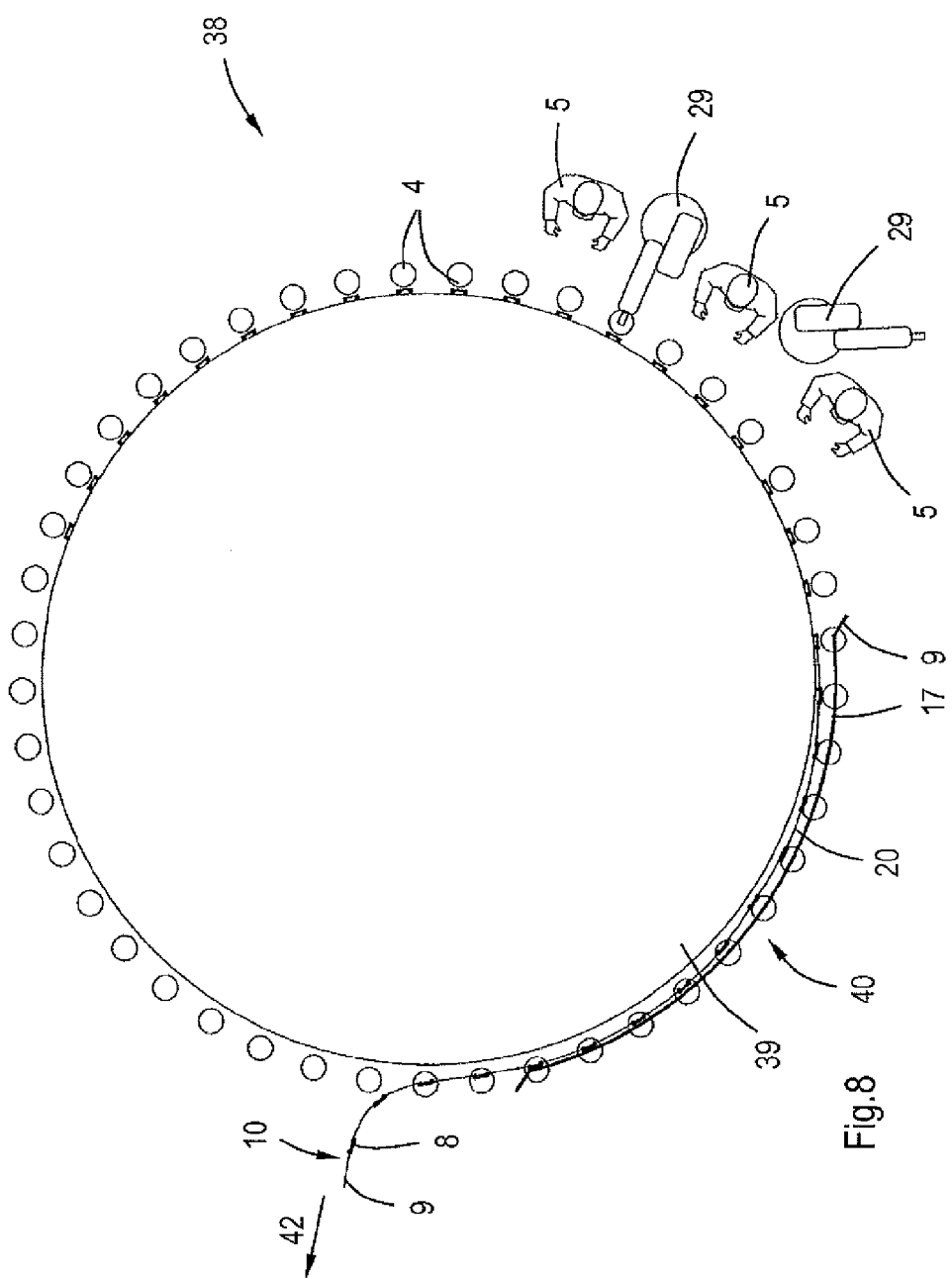
FIG. 8 is a top view of the carrousel installation shown in FIG. 7.
Figure 10C:
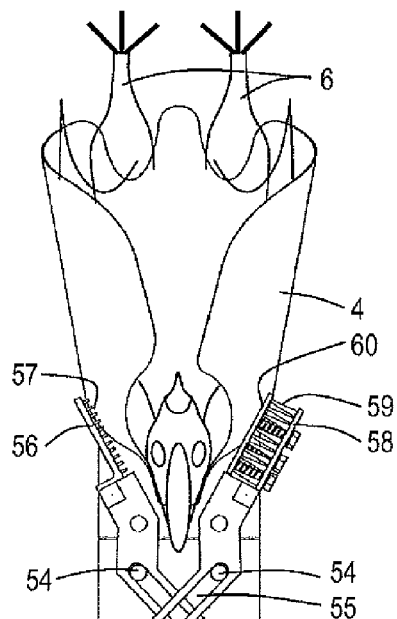
FIGS. 10A-10D show a confinement provided with an elegant form of electrode head-head stunning of poultry.
Figure 10A:
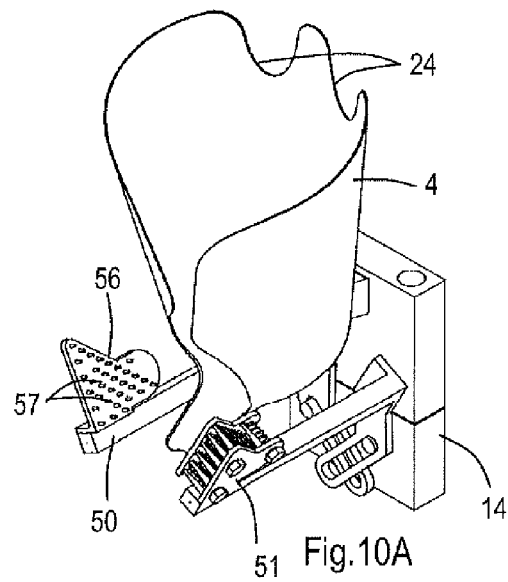
Figure 10D:
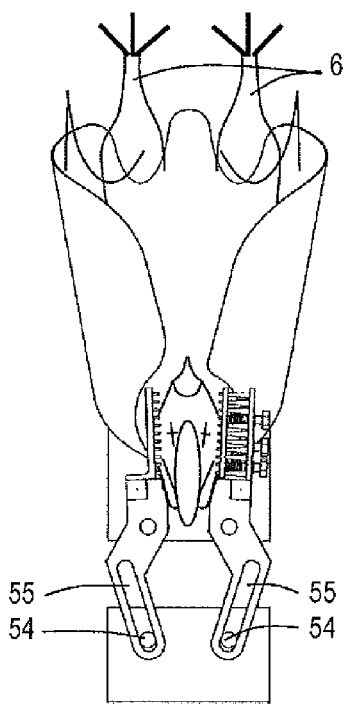
Figure 10B:
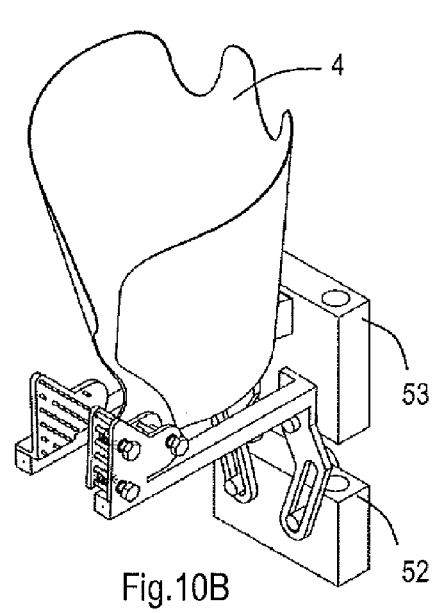

FIG. 8 shows an installation similar to the installation 38 shown in FIG. 7. The installation uses robots 29 and persons 4 for placing living poultry of various sizes, ages or sorts into the beakers 4. In sector 40 the chain 9 aligns with the carousel 39, and the legs are arrested by the bar 17 and ridge 20. After hooking by moving the shackles 8 upwardly by raising the chain 9 of the transport means 10 the living poultry is coupled the shackle 8 and moved along arrow 42 to halal slaughter means (not shown).

FIG. 9A-9B shows orientation means 43 for orienting the poultry before taking by the person 5 or robot 29. The orientation means 43 comprise a support 44 which support 44 can be rotated along the arrow 45 by the rotor 46. Thereby the poultry can be brought in a desired orientation such that the person 5 and robot 29 can carry out the same optimal movement for placing the poultry 2 in the confinement 3 and thereafter on the rider of the transported means 10. When oriented as shown in FIG. 9A the poultry 2 is translated into the beaker 4. Inserted in the beaker 4 the poultry 2 is mounted onto the installation 49 by connecting a rider part 48 carrying the beaker 4 to the rider 14, see FIGS. 9B and 9C.

FIGS. 10A-10D show a beaker 4 provided with new electrodes according to the invention. The electrode 50 comprises a plate 56 provided with pins 57. The electrode 51 comprises a plate 58 provided with pins 59 that may extend through a springs activated plate 60 provide with pin openings. The pins will extend through the plate 60 when the electrode 51 is pressed against the head of the living poultry. The spring activated plate may be adjusted to the size of the head of the poultry. This results in a reliable and optimal contact with the living poultry head for electro stunning. Thereto, the rider parts 52 and 53 move towards each other whereby the pins 54 travel through the slots 55 urging the electrodes 50 and 51 towards the poultry head.

Figure 11:
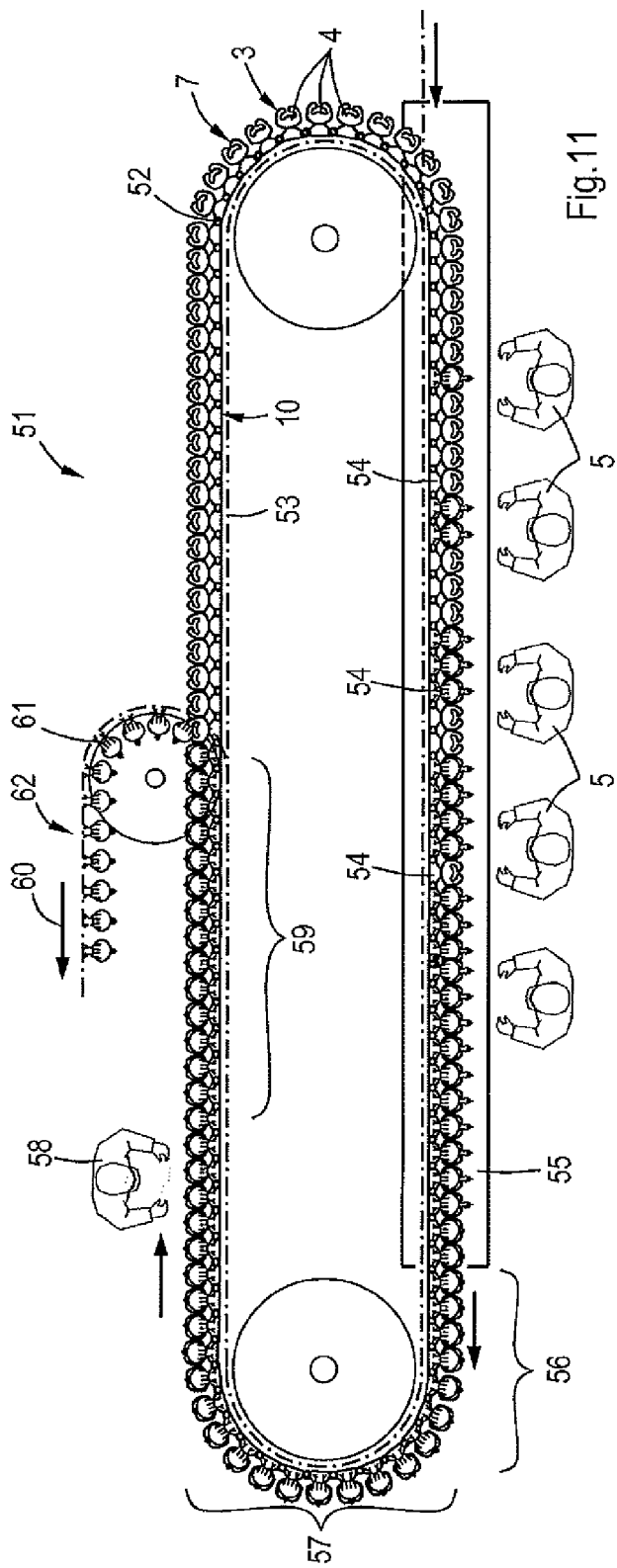
FIG. 11 is a top view of another installation according to the invention.

FIG. 11 shows an installation 51 according to the invention, comprising a carousel 52. The carousel 52 comprises a chain 53 carrying via transport means 10 confinements 3 in the form of beakers 4. Empty beakers 4 are filled with living poultry 54 by persons 5. This placing unit 55 is followed by a stunning unit 56 and thereafter by a slaughtering unit 57. A person 58 observes whether the poultry 54 is slaughtered in an acceptable manner. Thereafter in unit 59 are the slaughtered animals coupled to handling means 61 and via other transport means 62 are transported according to arrow 60 to a non-shown additional part of the slaughter line.

The installation 51 is explained in further detail with reference to FIGS. 12A-12F. FIG. 12A shows the installation 51 at the entrance of the placing unit 55. The beaker 4 is empty and the stunning means 63 in the form of electro stunning electrodes 64 are in a separate position allowing the localization of the head of the poultry there between. As shown in FIG. 12B the person 5 places the living poultry 54 into the beaker 4 and thereby arrives the head 65 of the living poultry 54 in between the electrodes 64. Subsequently, as shown in FIG. 12C, the electrodes 64 move towards the head 65 of the living poultry 54 and make contact for electro-stunning. The situation shown in FIG. 12C is in the stunning unit 56. It is noted that the legs 6 of the poultry 54 already extend upwardly out of the beaker 4. After stunning the poultry stunned is arriving in the slaughter unit 57 the head 65 of the poultry 54 remains in between the electrodes 64 but allows sufficient space for a slaughter element 66 to approach the neck of the poultry 54. As shown in FIG. 12C'' the slaughter element 66 comprising a sharp cutting knife 67, cuts the neck 68 of the poultry 54 following a movement represented by the double arrow 69. The cutting of the neck artery is reliably carried out because the electrodes 64 have moved to the outward position. Thereby, leaving more space for the knife 67 to reach and cut the neck 68 of the poultry 54. After cutting the neck 68 of the poultry 54, the death animal is bleeded as shown in FIG. 12D. Subsequently, as described in more detail with for instance FIG. 3, the extended legs 6 are localized and arrested by a bar 17 and coupled to the shackle 8 because as shown in FIG. 12E the beaker with the electrodes 64 moves downwardly, whereby the legs 6 of the poultry 54 are hooked to the shackle 8. With the beaker 4 and the electrodes 64 in the lowered position, the slaughtered poultry 54 hanging with the legs 6 in the shackle 8 is now in the unit 59 and transported by the transport means 62.

FIGS. 13A-13F show another installation 70 according to the invention, which is a variant of the installation 51 as shown in FIGS. 12A-12F. In this case as shown in FIG. 13C the living poultry is electro-stunned with the electrodes approaching the head 65 of the poultry 54 in the stunning unit 56. In the slaughter unit 56, the electrodes 64 carried by the support member 71 is moved away (with the electrodes 64 in their open position) allowing maximum space for the slaughter element 66 to approach the neck 68 of the poultry 54. Subsequently, as described in relation to FIG. 12, the beaker 4 with its support member 72 also moves downwardly whereby the legs 6 of the poultry 54 are coupled to the shackle 8 and thereto a bar 17 directs the legs 6 into the shackle (see FIG. 13E). Finally, in unit 59 is the death poultry 54 coupled with the legs 6 to the shackle 8 freely available and can be transported in the direction indicated by arrow 60 in FIG. 11.

In an alternative to the installations 51 and 70 as described above, the chain 53 carries via the transport means 10 the confinements 3 in the form of the beakers 4. The electrodes 64 mounted on the electrode supports 71 are carried by separate transport means that follow the circumference of the left carrousel turning wheel and do not follow the chain 53 around the entire carousel path running around and between both carrousel turning wheels. It is only along a part of the path around the left turning wheel that the electrodes 64 move in the same manner as the beakers 4 filled with poultry 54. This common path forms the stunning unit 56. The electrodes 64 there cooperate with the beakers 4 for stunning the poultry 54 as described above. Subsequently, the electrodes 64 and beakers 4 move away from one another. The stunned poultry is then handled in the manners described, such as in the installations 51 and 70. The electrodes run around the turning wheel to a new engagement with another beaker. This alternative installation provides the advantage that a reduced number of electrodes is required than the number of beakers.

It is noted, that as described in relation to the installations 51 and 70, it is possible to place the living animals in the confinement and then first stun and slaughter the animal and after debleeding couple the animal by its legs to the shackles and then further transport and process the couples and hanging poultry. It is noted that when slaughtering is required to take place in a halal manner, the stunning operation as disclosed in relation to FIGS. 12 and 13 are not used or not used in an operating manner.

FIGS. 14A-14C show another embodiment of a beaker 72 and an adapted shackle 73. The beaker 72 comprises a converging circumferential wall 74 converging to a bottom 75 which is open and is comprised with curved flexible side walls 76. The flexible side wall 74 adjusts automatically to the size of the bird and is further provided with a longitudinal slot 77.

The poultry is placed into the beaker 72 while its neck passes through the slot 77. The open bottom 75 and the curved wall parts 76 allow for a reliable positioning of the neck and head of the poultry 54.

The upper edge 78 of the beaker 72 is provided with two projecting positioning elements 79 defining with a intermediate spacer element 80 seats 81 for receiving a leg 6 of the poultry 54. As shown in particular in FIG. 14A, the shackle 73 comprises two vertical bars 82 which with short cross bars 83 and an intermediate spacing bar 84. They are flush with the seats 81 allowing reliable insertion of the legs 6 in each of the seats 81. When the shackle 73 moves upwardly in the direction of the arrow 85 (or the beaker 72 moves downwardly, or both beaker and shackle move away from each other), the spacing function of the spacing element 80 is taken over by the spacing bar 84 and urges the legs 6 of the poultry 54 precisely into the seats 81.

FIG. 14C shows that prior to the coupling of the legs 6 into the seats 81 of the shackle 73 that using a knife 67 the neck 68 is cut and thereby the animal is killed and debleeded. FIG. 14C shows that the position of the neck 68 is localized in a controlled and reliable manner by the confinement 3 in the form of the beaker 72, so that after stunning (which could be avoided when slaughtering in a halal manner is required) slaughtering and debleeding can occur in a reliable manner.

FIGS. 15A-15F show a part of an installation 86 of the invention for positioning and coupling the legs 6 of the living poultry 54 to the handling means 87 having the form of a shackle 73. The rider 14 is provided with a structural positioning element 88 having a wedge shape defining seats 81 which register with similar seats of the shackle 73. In FIG. 15A the living poultry is placed by a person or robot (not shown) in the beaker 4. As shown in FIG. 15B, the head 64 of the living poultry 54 extends out of the beaker 4 in a positioned manner and exposed for subsequent stunning. The legs 6 are urged by the beaker form in an anatomical movement to extend through the shackle 73 and are parted by the wedge 88. The parted legs register with the seats 81. In this position the poultry in stunned in FIG. 15C. The stunning could be head-head electro stunning, gas stunning or water bath stunning. As shown in the FIGS. 15D-15F the stunned poultry 89 is lifted from the beaker 4 while hooked without interference by a person to the shackle 73. Similarly the hooking to the shackle 73 could also be accomplished without the stunning in FIG. 15C.

FIGS. 16A-16E show another installation 96 of the invention. As shown in FIG. 16A, the rider 14 is provided with a positioning element 90 having the form of a wedge 90 and is movable over the rider to and fro the beaker 4 with a motor (not shown) coupled to a toothed rack 91. As shown in FIG. 16A, the living poultry is placed in the beaker 4 with the head 64 extending and the legs 6 extending upwardly. The wedge 90 is moved towards the poultry 54 as shown by the arrow 92 and passes in between the legs 6 which are thereby positioned and seated in the seats 81 which register with the seats 81 of the shackle 73. The shackle 73 moves towards the legs 6 following the arrow 93, see FIG. 16B. After having received the positioned legs 6 in the seats 81 of the shackle 73 as shown in FIG. 16C, stunning of the living poultry could take place. The wedge is retracted following arrow 94 in FIG. 16D. The poultry coupled with the legs 6 to the shackle 73 (without human or robot interference) is lifted from the beaker 4 following the arrow 95.

FIGS. 17A-17E show another installation 97 according to the invention. In this case the positioning element or wedge 90 is provided with arresting means 98 having the form of swingable arms 99 placed at the outside of the seats 81 of the wedge 90. After having been placed in the beaker 4 with the legs 6 extending (see FIG. 17A) the wedge 90 is moved along the arrow 92 towards the living poultry 54. The wedge 90 moves in between the legs 6 which are thereby positioned. Subsequently, the arms 99 are swung by a motor 100 against the legs 6. Thereby the legs are arrested against an undesired (spastic) movement. The poultry 54 may be stunned. Thereafter, the shackle 73 is coupled to the positioned and arrested legs 6. The arms 99 are swung out of contact with the legs 6 and the wedge 90 is retracted. A movement of the shackle 73 along the arrow 95 will release the poultry 89 in a reliable manner out of the beaker 4 and coupled to the handling means 87.

Figure 19C:
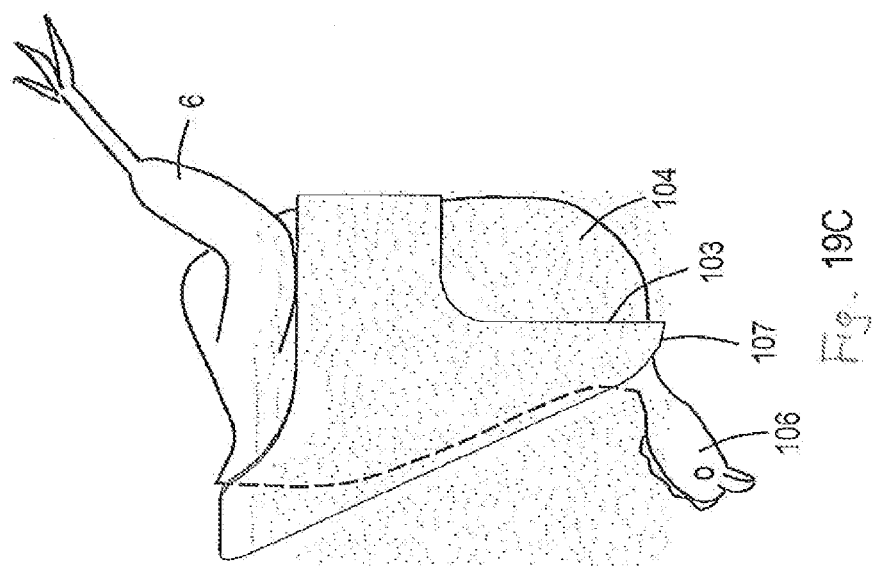
FIGS. 19A-19C show an alternative confinement provided with a poultry breast opening.
Figure 19B:
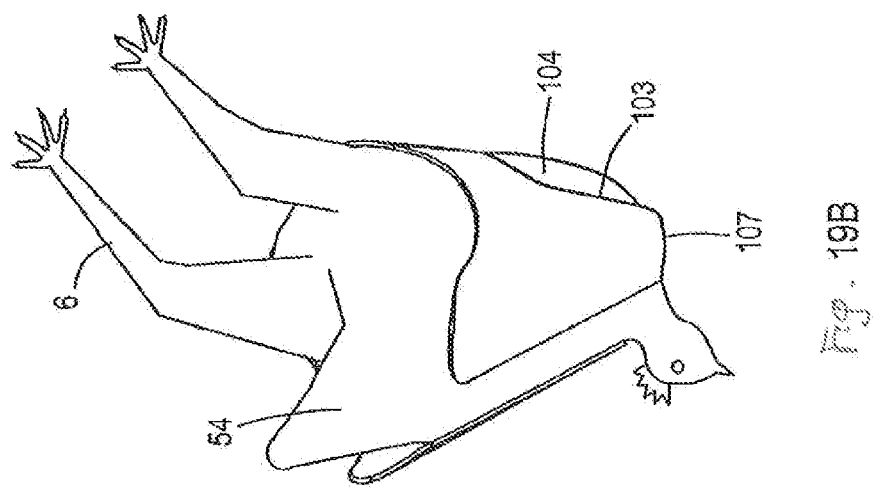
Figure 19A:
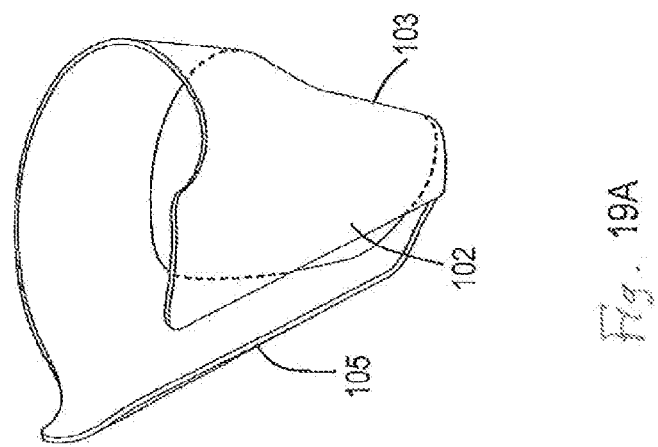

FIGS. 18A to 18F disclose another installation 101 according to the invention. The installation 101 comprises a confinement 102 comprising a breast opening 103 for accommodating the breast 104 of the poultry 54. Accordingly, the confinement is optimal for use in handling and coupling larger poultry, such as chicken hens. As shown in FIGS. 19A to 19B the poultry 54 is placed in the confinement 102 while passing the neck and head 106 of the poultry 54 along a side slot 105. The breast 104 extends through the breast opening 103 and rests on the confinement bottom 107. The optimal confining also results in an extending of the poultry legs 6 from the confinement 102 to positions for coupling the legs 6 to the handling means in the form of the shackle 73, such as in FIGS. 18A to 18F.

The installation 101 further comprises a rider 108 which is vertically movable and is part of the transport system for the other embodiments of the installation of the invention. The rider 108 carries stunning electrodes 109 and 110 which reciprocate in a horizontal plane and are pivotable around a substantially vertical axis. At least one electrode 110 is provides with a spring tensioned electrode plate 111 for optimal contact of both electrodes with the poultry head 106. In the alternative, the electrodes 109 and 110 may be the same and both provided with the spring tensioned plate 111 or the plate 111 is absent. The head 106 of the poultry is arrested in between the electrodes 109 and 110 and electro stunning is completed, while the poultry is confined in the confinement 102 and the legs stretched and extending into the shackle 73. Obviously, the confinement 102 and the pivotable electrodes may be used in any installation for handling and/or stunning poultry, such as described above in the other installations of the invention.

The invention claimed is:

1. A method for handling living poultry, such as chicken, turkey, geese, duck and quail, comprising the steps of:
   i) taking the living poultry;
   ii) placing the living poultry in a downwardly suspended position with the head positioned downwardly and the legs extended upwardly in a confinement such that the poultry legs extend from the confinement; and
   iii) coupling the poultry legs that extend upwardly from the confinement to handling means comprising hooking the poultry legs to hook means comprised by the handling means, the living poultry being in a downwardly suspended position.

2. The method as claimed in claim 1, wherein the coupling step iii) comprises a relative movement between the confinement and the handling means.

3. The method as claimed in claim 2, wherein the handling means comprise transport means for transporting the coupled poultry to working means.

4. The method as claimed in claim 3, wherein the coupled poultry is stunned and/or slaughtered.

5. The method as claimed in claim 4, wherein the confinements and means for stunning are transported by separate transportation means.

6. The method as claimed in claim 3, wherein after step (ii) the poultry placed in the confinement is stunned.

7. The method as claimed in claim 6, wherein the stunned poultry is slaughtered.

8. The method as claimed in claim 3, wherein during coupling the confinement moves at a speed substantially equal to the transport means speed.

9. The method as claimed in claim 1, wherein before the coupling step iii) the poultry legs are positioned and/or arrested.

10. The method as claimed in claim 9, wherein the poultry is oriented in a defined position prior to the taking the poultry in step i).

11. The installation as claimed in claim 1, comprising poultry leg handling means selected from the group consisting of means for positioning the poultry legs, means for arresting the poultry legs, and combinations thereof.

12. The installation as claimed in claim 11, wherein the confinement is selected from the group consisting of a poultry breast opening, at least one stunning electrode pivotable in a substantially horizontal plane, and combinations thereof.

13. The installation as claimed in claim 11, further comprising means for orienting the poultry to be taken in a defined position prior to the taking the poultry by the taking means.

14. The method as claimed in claim 1, wherein the living poultry of the placing step is neither stunned nor slaughtered.

15. An installation for handling living poultry, such as chicken, turkey, geese, duck and quail, comprising:
    means for taking the living poultry and placing the living poultry in a confinement such that the living poultry is in a downwardly suspended position with the head positioned downwardly and the poultry legs extend upwardly from the confinement; and
    means for coupling the poultry legs that extend upwardly from the confinement to handling means, wherein the coupling means comprises hooking means for hooking the poultry via the legs, the poultry being in a downwardly suspended position.

16. The installation as claimed in claim 15, wherein the coupling means and confinement are relatively movable for coupling the poultry legs to the handling means.

17. The installation as claimed in claim 16 comprising transport means for transporting the coupled poultry to working means and during coupling the confinement and the coupling means move at a speed substantially equal to the speed of the transport means.

18. The installation as claimed in claim 17, comprising stunning means and/or slaughter means.

19. The installation as claimed in claim 18, wherein the confinement and stunning means are transported by separate transportation means.

20. The installation as claimed in claim 15, wherein the confinement is configured such that the living poultry is neither stunned nor slaughtered.

* * * * *